United States Patent
Arase et al.

(10) Patent No.: US 6,988,794 B2
(45) Date of Patent: Jan. 24, 2006

(54) INKJET RECORDING INK, METHOD FOR PRODUCING SAID INK, AND INK CARTRIDGE AND RECORDING DEVICE HAVING SAID INK

(75) Inventors: Hidekazu Arase, Fukuoka (JP); Mamoru Soga, Osaka (JP); Hiroyuki Matsuo, Osaka (JP); Masaichiro Tatekawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 29 days.

(21) Appl. No.: 10/468,342

(22) PCT Filed: Mar. 8, 2002

(86) PCT No.: PCT/JP02/02219

§ 371 (c)(1), (2), (4) Date: Aug. 18, 2003

(87) PCT Pub. No.: WO02/072718

PCT Pub. Date: Sep. 19, 2002

(65) Prior Publication Data

US 2004/0095449 A1    May 20, 2004

(30) Foreign Application Priority Data

Mar. 8, 2001  (JP) .................. 2001-064378
Mar. 8, 2001  (JP) .................. 2001-064482

(51) Int. Cl.
*B41J 2/01* (2006.01)

(52) U.S. Cl. .................. 347/100; 347/95; 523/160

(58) Field of Classification Search ............... 347/100, 347/96, 95, 101; 106/31.13, 31.27, 31.6; 523/160

See application file for complete search history.

(56) References Cited

U.S. PATENT DOCUMENTS

| | | | |
|---|---|---|---|
| 5,100,470 A | * | 3/1992 | Hindagolla et al. .......... 347/100 |
| 5,183,501 A | * | 2/1993 | Kawashita et al. .......... 347/100 |
| 5,972,087 A | * | 10/1999 | Uraki et al. .............. 106/31.65 |
| 6,264,730 B1 | * | 7/2001 | Matsumura et al. ...... 106/31.43 |

FOREIGN PATENT DOCUMENTS

| | | |
|---|---|---|
| EP | 856566 A1 | 8/1998 |
| EP | 940456 A1 | 9/1999 |

(Continued)

OTHER PUBLICATIONS

International Search Report for International Application No. PCT/JP02/02219 completed May 29, 2002, ISA/JPO.

*Primary Examiner*—Manish S. Shah
(74) *Attorney, Agent, or Firm*—Harness, Dickey & Pierce, P.L.C.

(57) ABSTRACT

In an ink for ink jet recording use including a water-soluble dye, a humectant, a penetrant, water and a hydrolyzable organic silicon compound, silicon atoms (62) are contained in the ink at a ratio of 3.3 or more with respect to one hydrophilic group (52) in the water-soluble dye molecules (50) so that at least the whole hydrophilic groups (52) in the water-soluble dye molecules (50) are surrounded by silicon atoms (62) as a result of a condensation and polymerization reaction of said organic silicon compound.

15 Claims, 9 Drawing Sheets

FOREIGN PATENT DOCUMENTS

| | | | |
|---|---|---|---|
| EP | 940456 A1 * | 9/1999 | |
| EP | 1010739 A1 | 6/2000 | |
| EP | 1010739 A1 * | 6/2000 | |
| JP | 6-220379 A | 8/1994 | |
| JP | 11-293167 | 10/1999 | |
| JP | 2003119413 A * | 4/2003 | |

* cited by examiner

INKJET RECORDING INK, METHOD FOR PRODUCING SAID INK, AND INK CARTRIDGE AND RECORDING DEVICE HAVING SAID INK

BACKGROUND OF THE INVENTION

The present invention relates to ink for ink jet recording suitable for ink jet recording, a process for preparing said ink, and ink cartridge and recording apparatus including said ink.

Up till now, as the ink used for ink jet recording, an ink comprising a dye serving as a colorant, a humectant, a penetrant and water has been well known. However, when forming images on a recording medium such as a recording paper with the ink that contains a water-soluble dye, there is a problem in the water-resistivity of the images. Specifically, when the images get wet with water, the dye contained in the ink dissolves out into water. In particular, when recording images on a plain paper (widely-commercialized papers particularly used for copy machines of electronic photograph type and not intended to provide optimum structure, composition, characteristics, etc. to papers purposed to use for ink jet recording), the water-resistivity of the images is so inferior.

Accordingly, as disclosed in Japanese Patent Laid-open Nos. 10-212439, 11-293167 and 11-315231, it has previously proposed to improve the water-resistivity of the images recorded on a recording medium by causing the ink to contain a hydrolyzable silane compound (an organic silicon compound) therein. Specifically, when the inks disclosed in the foresaid references are used, the ink in the form of droplets adheres onto a recording medium, followed by evaporation of water contained in the ink or penetration of the water into the recording medium, whereby the silane compound remained on the recording medium gives rise to a condensation and polymerization reaction, and then, the condensed and polymerized silane compound surrounds the molecules of the dye. Accordingly, the water-resistivity of the images is improved because, even though the images formed on the recording medium get wet with water, the dye molecules will never be dissolved out into water.

Since there has been no distinctive guide as to the content of the silane compound in the ink, however, the silane compound having completed the condensation and polymerization reaction cannot sufficiently surround the dye molecules in the ink, and therefore, there has been a problem of difficulty in stably obtaining the water-resistivity improving effect with the silane compound.

Now, explanation is given on this problem with reference to FIGS. 10 and 11. FIG. 10 is a model view showing a state when the silane compound has completed the condensation and polymerization reaction after adhesion of the ink droplets onto the recording medium and evaporation of water contained in the ink. Note that, in FIG. 10, though the network structure 70 of the silane compound is illustrated as a two-dimensional structure, the silane compound is actually structured in a three-dimensional structure. As shown in FIG. 10, when a silicon atom 62 and oxygen atom 63 both in a silane compound are bonded with each other to form a substantially-uniform network structure 70 of a silane compound, all of the dye molecules 50 are surrounded by the network structure of the silane compound. Accordingly, the dye molecules 50 will never be dissolved out into water even though the images on the recording medium get wet with water.

However, the reaction of said silane compound is indeed not completed thoroughly and firmly, and it is considered that there are portions where the silicon atom 62 and the oxygen atom 63 have not bonded. Thus, it is considered that defective portions 70A are given in the network structure 70 of the silane compound. If the size of the defective portion 70A is larger than the size of the dye molecule 50, the dye molecule 50 supposed to be surrounded by the network structure 70 is dissolved out into water through the defective portion 70A when the images on the recording medium are getting wet with water.

The present invention is achieved in view of the above-mentioned conventional problems, and it is an object of the present invention to provide the ink for ink jet recording use that can stably exert excellent waterresisting characteristic, a process for preparing said ink, a cartridge including said ink and a recording apparatus including said ink.

SUMMARY OF THE INVENTION

The present inventions of the first to eighteen aspects are constituted in view of the respective dye molecules in the ink, and each of the inventions of those aspects is constituted such that silicon atoms surround at least the hydrophilic groups of the dye molecules through a condensation and polymerization reaction of the organic silicon compound to block hydrogen bonds between the hydrophilic groups of the dye molecules and water molecules.

Specifically, in the invention of the first aspect, it is directed to an ink for ink jet recording use comprising a water-soluble dye, a humectant, a penetrant, water and a hydrolyzable organic silicon compound. The ink of this invention adheres onto a recording medium, and then, the organic silicon compound contained in the ink gives rise to a condensation and polymerization reaction through evaporation of water contained in the ink or penetration of said water into the recording medium, whereby at least the whole hydrophilic groups of the water-soluble dye molecules are surrounded by the silicon atoms derived from the organic silicon compound.

With such a constitution, at least the hydrophilic groups of the water-soluble dye molecules are surrounded by the silicon atoms of the organic silicon compound that has given rise to said condensation and polymerization reaction. Accordingly, the hydrogen bonds formation between the hydrophilic groups of the dye molecules and the water molecules in the images formed on the recording medium with the ink is blocked by the silicon atoms, even when the images are getting wet with water. In this way, the dye molecules are made such that they are hardly drawn to the water molecules. As a result, the dye molecules are prevented from dissolving out into water with a high probability. Furthermore, if the organic silicon compound surrounds only the hydrophilic groups in the dye molecules, it allows the images to acquire water-resistivity in a short time, as well as providing advantageous effect in economical point of view.

The ink according to the invention of the second aspect is an ink for ink jet recording use comprising a water-soluble dye, a humectant, a penetrant, water and a hydrolyzable organic silicon compound, wherein the content of the organic silicon compound is set such that the ink contains silicon atoms at a ratio of more than 3.3 with respect to one hydrophilic group in the water-soluble dye molecules.

If the total number of the silicon atoms in the organic silicon compound is too less comparing to the total number of the water-soluble dye molecules, it becomes difficult for the silicon atoms to surround the whole hydrophilic groups of the water-soluble dye molecules. In the above-described ink, the hydrophilic groups in the dye molecules can substantially be surrounded by the silicon atoms, because the silicon atoms are contained at a ratio of 3.3 or more with respect to one hydrophilic group of the water-soluble dye molecules. Note that, theoretically, if there are four silicon atoms with respect to one hydrophilic group, these silicon atoms form a network wherein each of four silicon atoms positions at the apex of the tetrahedron, respectively. By forming such networks, the whole hydrophilic groups are surrounded completely. Thus, if more than four silicon atoms per one hydrophilic group of the water-soluble dye molecule are contained in the ink, it is more preferable for the ink jet recording since the water-resistivity of the formed images is surely improved.

The ink according to the invention of the third aspect is an ink for ink jet recording use comprising a water-soluble dye, a humectant, a penetrant, water and a hydrolyzable organic silicon compound, wherein the ink adheres onto the recording medium, and then, the organic silicon compound gives rise to a condensation and polymerization reaction through evaporation of water contained in the ink or penetration of said water into the recording medium, whereby the whole molecules of the water-soluble dye are surrounded by the silicon atoms.

With the above constitution, the whole molecules of the water-soluble dye are surrounded by the organic silicon compound that has given rise to the condensation and polymerization reaction. Accordingly, the molecules of the water-soluble dye are blocked by the silicon atoms from the water molecules even though the images formed with said ink on the recording medium are getting wet with water. Therefore, the water-soluble dye is prevented from dissolving out into water with a high probability and the water-resistivity of the images is remarkably improved. Furthermore, even though the recording medium is immersed in water for a long time, no dissolving out of the water-soluble dye into water is taken place.

The ink according to the invention of the fourth aspect is an ink for ink jet recording use comprising a water-soluble dye, a humectant, a penetrant, water and a hydrolyzable organic silicon compound, wherein the content of the organic silicon compound is set such that the ink contains silicon atoms at a ratio of 6.4 or more with respect to one molecule of the water-soluble dye.

If the number of the silicon atoms of the organic silicon compound is too less with respect to the number of the molecules of the water-soluble dye, it becomes difficult for the silicon atoms to surround the whole molecules of the water-soluble dye. For the above-described ink, it is possible for the silicon atoms to substantially surround the molecules of the water-soluble dye, if the silicon atoms are contained at a ratio of 6.4 or more with respect to one molecule of the water-soluble dye. Note that, theoretically, if there are eight silicon atoms with respect to one molecule of the dye, the whole molecules of the dye can be surrounded completely. Thus, if eight or more silicon atoms per one molecule of the water-soluble dye are contained in the ink, it is more preferable for the ink jet recording since the water-resistivity of the formed images is further improved.

The ink according to the invention of the fifth aspect is an ink for ink jet recording use comprising a water-soluble dye, a humectant, a penetrant, water and a hydrolyzable organic silicon compound, wherein the ink adheres onto the recording medium, and then, the organic silicon compound gives rise to a condensation and polymerization reaction through evaporation of water contained in the ink or penetration of said water into the recording medium, whereby the whole molecules of the water-soluble dye are surrounded at least doubly by the silicon atoms.

With use of the ink according to this invention, the molecules of the dye are surrounded at least doubly with the network of the silicon atoms of the organic silicon compound that has given rise to the condensation and polymerization reaction. Accordingly, even when images on the recording medium are subjected to friction, the dye is hardly exfoliated. As a result, not only water-resistivity but also durability against friction of the formed images can be improved. Therefore, for example, even overwriting the images formed with the ink using a fluorescent line marker, abrasion of the ink, namely tailing of the ink, will never occur.

The ink according to the invention of the sixth aspect is an ink for ink jet recording use comprising a water-soluble dye, a humectant, a penetrant, water and a hydrolyzable organic silicon compound, wherein the content of the organic silicon compound is set such that the ink contains silicon atoms at a ratio of 20 or more with respect to one molecule of the water-soluble dye.

If the number of the silicon atoms of the organic silicon compound is too less comparing to the number of the molecules of the water-soluble dye, it becomes difficult for the silicon atoms to doubly surround the whole molecules of the water-soluble dye. With the ink according to the invention of this aspect, the network of the silicon atoms that surround the molecules of the water-soluble dye doubly is formed since the silicon atoms are contained at a ratio of 20 or more with respect to one molecule of the water-soluble dye, whereby the durability against friction of the formed images is improved.

It is preferable for the surface tensions of the foresaid inks for ink jet recording use according to the invention of the first and second aspects to be in a range from 20 mN/m to 40 mN/m.

In general, when the content of the organic silicon compound increases, it becomes hard for the evaporation of water contained in the ink and penetration of said water into the recording medium at the time droplets of the ink adhere onto the recording medium to be made fast. In spite of such tendency, since each of said inks has a surface tension of 40 mN/m or less, the droplets of the ink is easily dried on the recording medium because the ink droplets can penetrate into the medium quickly even though the content of the organic silicon compound is high. Thus, it is possible to prevent the fast drying property of the ink from lowering, which might be caused due to increase of the content of the organic silicon compound, and improve the speed of the recording to be further faster. On the other hand, since the ink has the surface tension of 20 mN/m or more, the ink ejected from the ink jet head can be formed into suitable ink droplets and flied in a stable fashion toward the recording medium. That is, stable ejecting performance can be achieved with the ink according to the inventions of these aspects.

For the respective inks for ink jet recording use according to the inventions of the third to sixth aspects, it is preferable to set their surface tensions at 25° C. to a range from 20 mN/m to 50 mN/m.

As described in the above, with setting the surface tension to the above-mentioned range, the fast drying property of the ink droplets can be prevented from lowering, said lowering in the drying property might be caused due to increase of the content of the organic silicon compound. Further, stable ejecting performance can be achieved as well.

In the respective inventions of the seventh to twelfth aspects, it is directed to an ink cartridge including an ink for ink jet recording use comprising a water-soluble dye, a humectant, a penetrant, water and a hydrolyzable organic silicon compound.

It is constituted in the invention of the seventh aspect such that the ink adheres onto a recording medium, and then, the organic silicon compound gives rise to a condensation and polymerization reaction through evaporation of water contained in the ink or penetration of said water into the recording medium, whereby at least the whole hydrophilic groups of the water-soluble dye molecules are surrounded by silicon atoms contained in the organic silicon compound.

It is constituted in the invention of the eighth aspect, that the content of the organic silicon compound is set such that the ink contains silicon atoms at a ratio of 3.3 or more with respect to one hydrophilic group of the water-soluble dye molecules.

In the invention of the ninth aspect, it is constituted such that the ink adheres onto a recording medium, and then, the organic silicon compound give rise to a condensation and polymerization reaction through evaporation of water contained in the ink or penetration of said water into the recording medium, whereby the whole molecules of the water-soluble dye are surrounded by the silicon atoms.

In the invention of the tenth aspect, the content of the organic silicon compound contained in the ink is set such that the ink contains silicon atoms at a ratio of 6.4 or more with respect to one molecule of the water-soluble dye.

In the invention of the eleventh aspect, it is constituted such that the ink adheres onto a recording medium, and then, the organic silicon compound gives rise to a condensation and polymerization reaction through evaporation of water contained in the ink or penetration of said water into the recording medium, whereby the whole molecules of the water-soluble dye are doubly surrounded by silicon atoms contained in the organic silicon compound.

In the invention of the twelfth aspect, the content of the organic silicon compound contained in the ink is set such that the ink contains silicon atoms at a ratio of 20 or more with respect to one molecule of the water-soluble dye.

In the ink cartridges according to the invention of the seventh to twelfth aspects, the same advantageous effect as obtained in the inventions of the first to sixth aspects can be obtained.

The inventions of the thirteenth to eighteenth aspects are respectively directed to a recording apparatus that is provided with an ink for ink jet recording use comprising a water-soluble dye, a humectant, a penetrant, water and a hydrolyzable organic silicon compound and is structured to eject said ink against a recording medium to thereby perform recordings onto the recording medium.

Among those inventions, the invention of the thirteenth aspect is constituted such that the ink adheres onto the recording medium, and then, the organic silicon compound gives rise to a condensation and polymerization reaction through evaporation of water contained in the ink or penetration of said water into the recording medium, whereby at least the whole hydrophilic groups in the water-soluble dye are surrounded by silicon atoms of the organic silicon compound.

In the recording apparatus according to the invention of the fourteenth aspect, the content of the organic silicon compound in the ink is set such that the ink contains silicon atoms at a ratio of 3.3 or more with respect to one hydrophilic group of the water-soluble dye molecules.

In the recording apparatus according to the invention of the fifteenth aspect, it is constituted that the ink adheres onto a recording medium, and then, the organic silicon compound gives rise to a condensation and polymerization reaction through evaporation of water contained in the ink or penetration of said water into the recording medium, whereby the whole molecules of the water-soluble dye are surrounded by silicon atoms of the organic silicon compound.

In the recording apparatus according to the invention of the sixteenth aspect, it is constituted that the content of the organic silicon compound in the ink is set such that the ink contains silicon atoms at a ratio of 6.4 or more with respect to one molecule of the water-soluble dye.

In the recording apparatus according to the invention of the seventeenth aspect, it is constituted such that the ink adheres onto a recording medium, and then, the organic silicon compound gives rise to a condensation and polymerization reaction through evaporation of water contained in the ink or penetration of said water into the recording medium, whereby the whole molecules of the water-soluble dye are doubly surrounded by silicon atoms of the organic silicon compound.

In the recording apparatus according to the invention of the eighteenth aspect, it is constituted that the content of the organic silicon compound is set such that the ink contains silicon atoms at a ratio of 20 or more with respect to one molecule of the water-soluble dye.

Therefore, even in the recording apparatuses according to the inventions of the thirteenth to eighteenth aspects, the same advantageous effect as those of the inventions of the first to sixth aspects can be obtained.

The inventions of the nineteenth to twenty-second aspects are inventions that presuppose the fact that, when a water-soluble substance (e.g., a silane compound) that gives rise to a condensation and polymerization reaction under a condition without water formed a network structure, a defective portion is produced in the network structure. In these inventions, the dye is prevented from dissolving out into water through the defective portion by way of making the size of the dye molecules greater than the size of the defective portion. Because of this, in the inventions of the nineteenth to twenty-second aspects, a substance for converting the dye molecules into multimers thereof is contained in the ink.

Specifically, the invention of the nineteenth aspect is directed to an ink for ink jet recording use comprising a dye, a humectant, a penetrant, water and said water-soluble substance that gives rise to a condensation and polymerization reaction under a condition without water. The ink of this invention contains said substance for converting the dye molecules into the multimers thereof by way of causing the dye molecules to produce hydrogen bonds, ionic bonds, or covalent bonds with said substance.

With such a constitution, when the ink droplets adhere onto a recording medium, the water-soluble substance gives rise to the condensation and polymerization reaction through evaporation of water contained in the ink or penetration of said water into the recording medium to thereby form the network structure. The dye (dye molecules) is absorbed within the network structure. At this time, even if defective portions were produced in the network structure, since the dye molecules have been converted into the multimers thereof, the sizes of the dye molecules having been converted into the multimers thereof are larger than those of the defective portions. Therefore, even when the images formed onto the recording medium with the ink are getting wet with water, the dye molecules are prevented from dissolving out into water through the defective portions. By this way, when forming the images with the ink containing said water-soluble substance, the water-resistivity of the formed images is still further improved.

Furthermore, since the dye molecules are converted into the multimers thereof, there is no change in the size of the dye molecules themselves. Accordingly, it is possible to improve the water-resistivity of the formed images without changing the tone of the ink (dye).

It is preferable that the dye is either an acid dye or a direct dye, and when it is so, it is preferable that said substance for converting the dye molecules into multimers is an organic diamine or an organic triamine.

By selecting the dye and the substance as described above, either sulfonic groups or carboxylic groups in the acid dye or the direct dye and amine groups in the organic diamine or the organic triamine form ionic bonds or covalent bonds. Therefore, if the ink contains the organic diamine, the dye molecules can be converted into the dimers thereof. On the other hand, if the ink contains the organic triamine, the dye molecules can be converted into the trimers thereof.

It is preferable that said organic diamine or said organic triamine is a primary amine. Since the primary amine has high basicity, the bonding property between said organic diamine or organic triamine and an acid dye or a direct dye is enhanced. Thus, by way of using a primary amine as said organic diamine or organic triamine, the dye molecules can be surely converted into the dimers or trimers thereof.

Note that, when a basic dye is used as the above dye, dicarboxylic acid or tricarboxylic acid may be used as the substance for converting the dye molecules into the multimers thereof.

The above-described water-soluble substance is preferably a hydrolyzable silane. Because the silane compound is so preferable in terms of improving the foresaid water-resistivity, and it can effectively exert the operational effect of the invention of the nineteenth aspect.

The invention of the twentieth aspect is directed to a process for preparing an ink for ink jet recording use comprising a dye, a humectant, a penetrant, water, a water-soluble substance that gives rise to a condensation and polymerization reaction under a condition without water and a multimer-forming substance for converting the -dye molecules into multimers by way of causing the dye molecules to form hydrogen bonds, ionic bonds or covalent bonds therewith. The process for preparing an ink according to the invention of the twentieth aspect is a process to add said dye and multimer-forming substance into said water, followed by an addition of said water-soluble substance.

Contrary to the above-described process, it is also possible to prepare the ink, for example, by way of adding a dye and a water-soluble substance into water, followed by addition of the multimer-forming substance for converting dye molecules into their multimers into said water. In this case, however, the formation of bonds between the dye molecules and the multimer-forming substance becomes hard because of the presence of the said water-soluble substance, whereby the dye molecules cannot be converted into the multimers sufficiently and surely.

Contrary thereto, with the firstly-described process, it is possible to previously form bonds between the dye molecules and the multimer-forming substance, though the bonding is weak, by way of firstly adding the dye and the multimer-forming substance into water. With the ink prepared by adding the water-soluble substance into the above described mixture of the dye molecules and the multimer-forming substance, said dye molecules and multimer-forming substance those which have previously formed weak bonds therebetween form hydrogen bonds, ionic bonds or covalent bonds when the ink adhered onto a recording medium and water contained in the ink evaporated or penetrated into the recording medium, to thereby permit the dye molecules to be surely converted into the multimers. Through the procedure as described above, the ink prepared according to the process of this invention can exert the operation and advantageous effect of the invention of the nineteenth aspect.

The invention of the twenty-first aspect is directed to an ink cartridge provided with an ink for ink jet recording use comprising a dye, a humectant, a penetrant, water and a water-soluble substance that gives rise to a condensation and polymerization reaction under a condition without water. In this invention, it is constituted such that the ink contains a multimer-forming substance that converts the dye molecules into the multimers thereof by causing the dye molecules to form hydrogen bonds, ionic bonds or covalent bonds with the multimer-forming substance. With the ink cartridge according to this invention, the same operational effect as that of the invention of the nineteenth aspect can be obtained.

The invention of the twenty-second aspect is directed to a recording apparatus provided with an ink for ink jet recording use comprising a dye, a humectant, a penetrant, water and a water-soluble substance that gives rise to a condensation and polymerization reaction under a condition without water and adapted to execute recordings on the recording medium by ejecting said ink against the recording medium. In this invention, it is constituted such that said ink contains a multimer-forming substance that converts the dye molecules into the multimers thereof by causing the dye molecules to form hydrogen bonds, ionic bonds or covalent bonds with the multimer-forming substance. With the recording apparatus according to this invention, it is possible to obtain the same operational effect as that of the invention of the nineteenth aspect.

DETAILED DESCRIPTION OF THE INVENTION BEST MODE FOR CARRYING OUT THE INVENTION

Ink Jet Type Recording Apparatus

Figure 1:
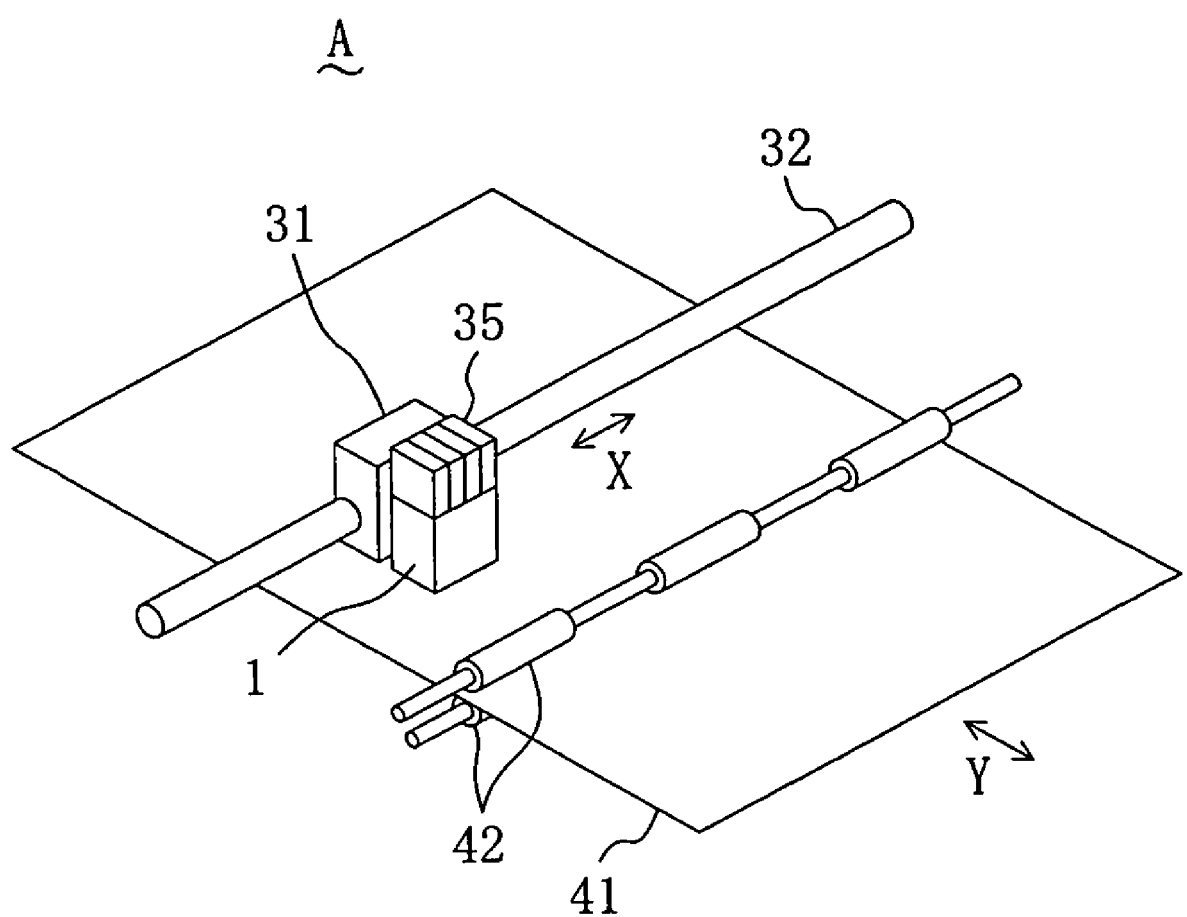
FIG. 1 is an oblique view showing the main parts of an ink jet type recording apparatus.
Figure 2:
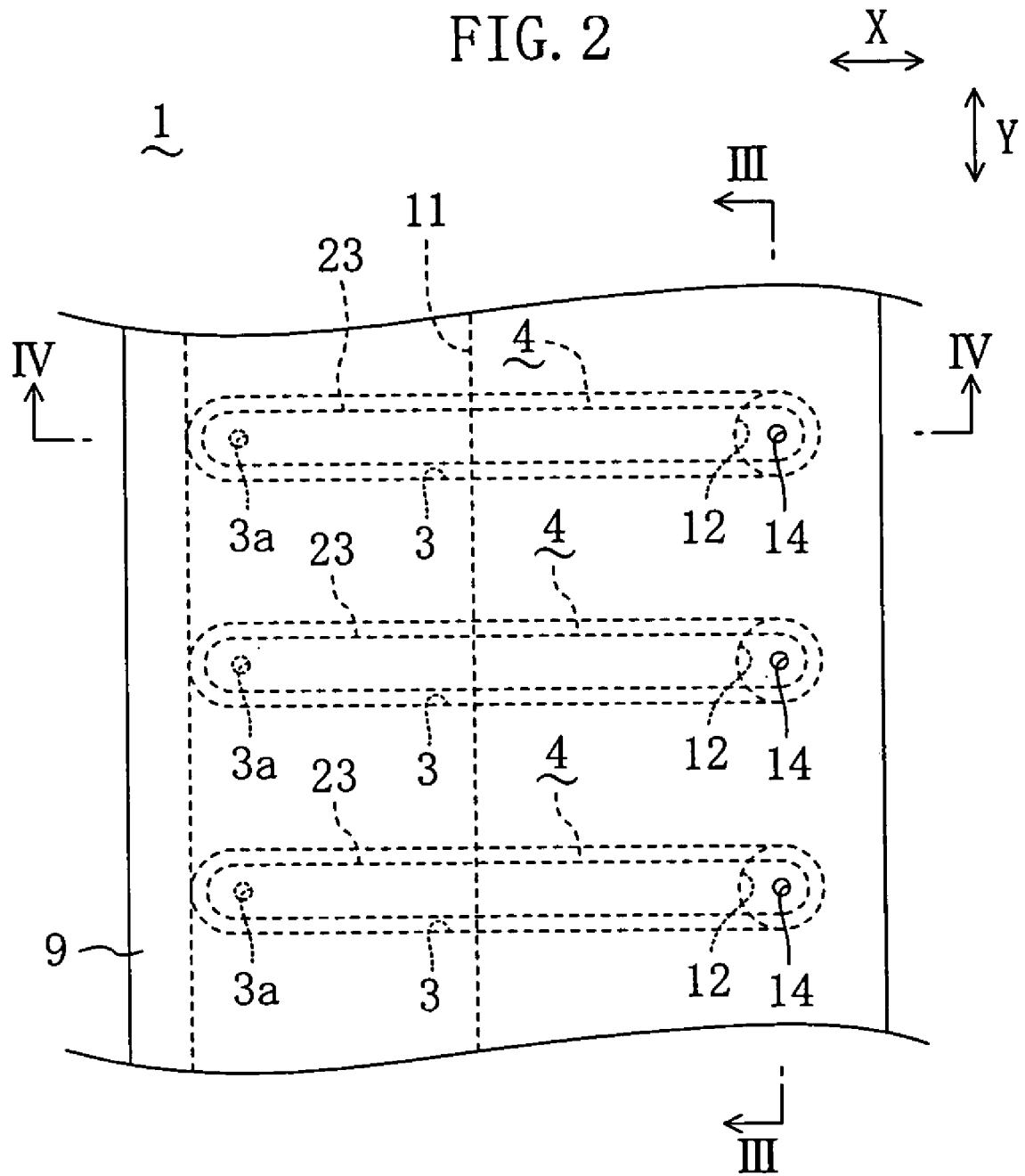
FIG. 2 is a partial bottom view of an ink jet head.

The modes for carrying out the present invention will now be explained with reference to the appended drawings. FIG. 1 schematically shows an ink jet type recording apparatus provided with an ink for ink jet recording use according to an embodiment for the present invention. The recording apparatus A is provided with an ink jet head 1 for ejecting the ink onto a recording paper 41 serving as a recording medium as will be described later. The ink jet head is mounted with an ink cartridge 35 for accommodating the ink on the upper face. The ink jet head 1 is fixedly supported by a carriage 31. The carriage 31 is provided with a carriage motor (not shown), said carriage motor causes the ink jet head 1 and the carriage 31 to be guided along a carriage shaft 32 extending in the main scan direction (X direction as shown in FIG. 1 and FIG. 2) to perform two-way movements in said main scan direction. The recording apparatus of this embodiment is constructed such that the ink jet head 1 and the recording paper 41 perform relative movements in the main scan direction by means of the carriage 31, the carriage shaft 32 and the carriage motor.

The recording paper 41 is put between carrier rollers 42 and 42 which are rotated by a carrier motor (not shown) and is carried by the carrier motor and the respective carrier rollers 42 in the lower region of the ink jet head 1 in the sub scan direction (Y direction as shown in FIG. 1 and FIG. 2) perpendicular to said main scan direction. In the recording apparatus of this embodiment, it is constructed such that the ink jet head 1 and the recording paper 41 perform relative movements in the sub scan direction by means of the carrier motor and the respective carrier rollers 42.

Figure 3:
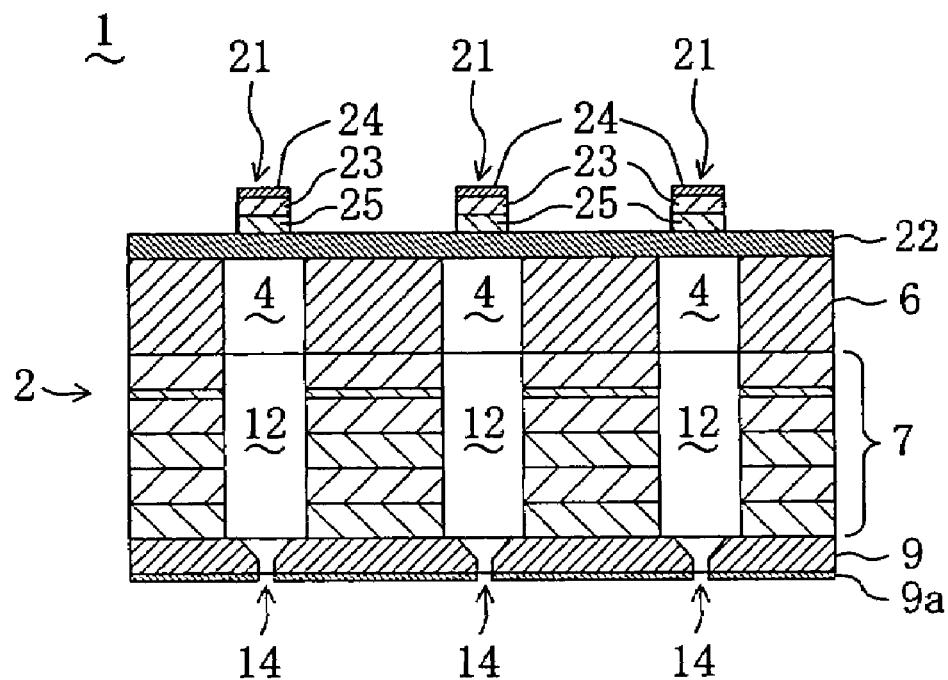
FIG. 3 is a cross-sectional view cut along the line III—III shown in FIG. 2.
Figure 4:
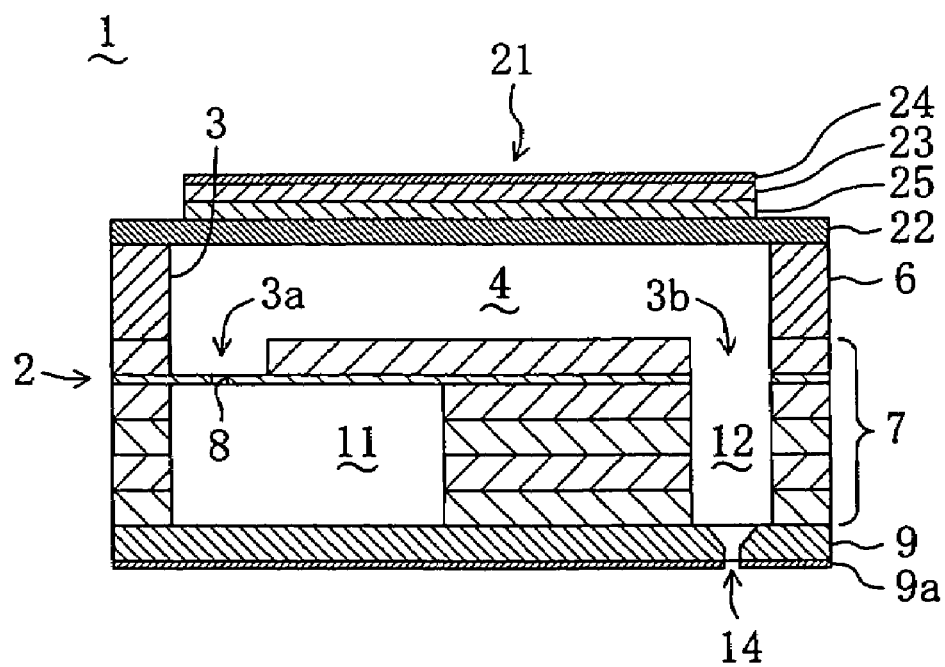
FIG. 4 is a cross-sectional view cut along the line IV—IV shown in FIG. 2.

As shown in FIGS. 2 to 4, the ink jet head 1 is provided with a head main body 2 in which a plurality of pressure chambers 4 each having an ink supply inlet 3a for supplying the ink and an ink ejecting outlet 3b for ejecting the ink are formed. The side wall sections of the pressure chambers 4 of the head main body 2 is constructed with pressure chamber parts 6 made of photosensitive glass with a thickness of c.a. 200 μm. The bottom wall section of the respective pressure chambers 4 is constructed with ink flow path parts 7 made by laminating six stainless steel plates, which is fixedly attached to the lower face of the pressure chamber part 6.

In the pressure chamber part 6, a plurality of openings 3 for forming the respective chambers 4 into sections are formed. Each of the openings 3 is opened such that it extends on the upper face of the head main body 2 in the main scan direction, and the openings are arranged in parallel in the sub scan direction with substantially equal distances. The whole length and width of the respective openings 3 are set to c.a. 1250 μm and c.a. 130 μm, respectively. Note that each of the both end portions of the respective openings 3 is formed in substantially a half-round shape.

In the ink flow path part 7, a plurality of orifice 8 each constituting the ink supply inlet 3a, an ink supply flow path 11 that connects to the orifice 8 and extends in the sub scan direction, and a plurality of ink-ejecting flow paths 12, each of which connects to the respective ink ejecting outlet 3b, are formed.

Each of the orifices 8 is formed in the second one from the top of the six stainless steel thin plates constructing the ink flow path part 7 that is thinner than the others. The diameter of the respective orifices 8 is set to c.a. 38 μm. The ink supply flow path 11 is connected to the ink cartridge 35, and it is constituted such that the ink is supplied from the ink cartridge 35 into the ink supply flow path 11.

A nozzle plate 9 made of stainless steel wherein a plurality of nozzles 14 for ejecting ink droplets against the recording paper 41 are formed are fixedly attached to the lower face of the ink flow path part 7. The lower face of the nozzle plate 9 is coated with a water-repellent film 9a. Each of the nozzles 14 is respectively connected with the ink-ejecting flow path 12 and is linked to the pressure chamber 4 through the ink-ejecting flow paths 12, respectively. With such an arrangement, the nozzles 14 are provided to the lower face of the ink jet head 1 such that they are placed in a row in the sub scan direction. Note that each of the nozzles 14 comprises a taper section where the diameter of the nozzle is tapered toward the tip side and a straight section provided at the nozzle tip side of the taper section. The diameter of the nozzle in the straight section is set to c.a. 20 μm.

On the upper faces of the respective openings 3 in the head main body 2, piezoelectric actuators 21 are respectively provided. Each of the piezoelectric actuators 21 closes the respective opening 3 in the head main body 2 under a state it is fixedly attached to the upper face of the head main body 2 and has a vibration plate 22 made of Cr constructing the pressure chamber 4 together with said opening 3. This vibration plate 22 is one element common for all of the piezoelectric actuators 21 and also serves as an electrode common for all of piezoelectric elements 23 that will be described later.

Further, each of the piezoelectric actuators 21 has a piezoelectric element 23 and a separate electrode 24 made of Pt. The piezoelectric elements 23 are made of lead zirconate titanate (PZT) and are respectively provided over the vibration plate 22 via intermediate layers 25 made of Cu. The piezoelectric elements 23 are respectively positioned at portions corresponding to the pressure chambers 4 (portions opposed to the openings 3) in the opposed side (upper side) of the vibration plate 22 to the pressure chambers 4. Each of the separate electrodes 24 is an electrode to impress (driving voltage) respectively to the piezoelectric elements 23 together with the vibration plate 22.

All of the vibration plate 22, each of the piezoelectric elements 23, each of the separate electrodes 24 and each of the intermediate layers 25 are formed of thin films. The thicknesses of the vibration plate 22, the respective piezoelectric element 23, the respective separate electrode 24 and the respective intermediate layer 25 are set to c.a. 6 μm, 8 μm or less (e.g., c.a. 3 μm), c.a. 0.2 μm, and c.a. 3 μm, respectively.

Each of the piezoelectric actuators 21 applies driving voltage to the respective piezoelectric element 23 via the vibration plate 22, the respective intermediate layer 25 and the respective separate electrode 24 and deforms the portion of the vibration plate 22 corresponding to the pressure chamber 4. Accordingly, the ink in the pressure chamber 4 is ejected through the nozzle 14. Specifically, when impressing pulse voltage to between the vibration plate 22 and the separate electrode 24, the portion of the vibration plate 22 corresponding to the pressure chamber 4 bends toward the pressure chamber 4 side and is deformed into a convex shape since, when the pulse voltage is raised, the piezoelectric element 23 shrinks in the width direction of the element perpendicular to the thickness direction due to piezoelectric effect while the vibration plate 22, the separate electrode 24 and the intermediate layer 25 do not shrink. Because of said bending deformation, pressure is generated in the pressure chamber 4. With the generated pressure, the ink in the pressure chamber 4 is ejected in the form of ink droplets onto the recording paper 41 through the nozzle 14 via the ink ejecting outlet 3b and the ink-ejecting flow path 12. The ejected ink droplets are adhered onto the recording paper 41 in dotted state. Then, when the pulse voltage fell, the piezoelectric element 23 elongates and said portion of the vibration plate 22 corresponding to the pressure chamber 4 turns back to its original state. At this stage, the ink is filled into the pressure chamber 4 from the ink cartridge 35 through the ink supply flow path 11 and the ink supply inlet 3a. Note that, as the pulse voltage impressed to the respective piezoelectric elements 23, it is not limited to the above-described push and pull type, and other types, for example, pulse voltage of pull and push type that fell from the first voltage to the second voltage being lower than the first voltage, then elevating up to the first voltage, may be used as well.

Said impression of the driving voltage to the respective piezoelectric elements 23 is performed every predetermined time (e.g. 50 $\mu$s more or less: drive frequency 20 KHz) while moving the ink jet head 1 and the carriage 31 in the main scan direction from one end of the recording paper 41 to the other end thereof at substantially a constant speed. However, the voltage is not impressed when the ink jet head 1 reached the portion on the recording paper 41 where the ink jet head 1 does not place the ink droplets. By taking such a manner, the ink droplets are shot to predetermined positions on the recording paper 41. Then, when the recording of one scan portion is completed, the recording paper 41 in a predetermined quantity is carried in the sub scan direction by means of the carrier motor and the carrier rollers 42, followed by causing the ink jet head 1 and the carriage 31 to move again with ejecting ink droplets in the main scan direction to perform recording for new one scan portion. By repeating such an operation, desired images are formed on the whole area of the recording paper 41.

Ink for Ink Jet Recording Use

Embodiment 1

The ink used for the recording apparatus A contains a water-soluble dye, a humectant for preventing the ink in the nozzles 14 and others of the ink jet head 1 from drying, a penetrant for enhancing the penetration property of the ink into a recording paper 41, water and a hydrolyzable silane compound as a hydrolyzable organic silicon compound that gives rise to a condensation and polymerization reaction even under a condition without water.

As said silane compound, for examples, hydrolyzed products of alkoxysilane containing an organic group having an amino group and alkoxysilane containing no amino group, organic silicon compounds obtainable by hydrolyzing a hydrolyzable silane prepared by reacting an organic monoepoxy compound with a hydrolyzable silane containing an amino group and a hydrolyzable silane containing no nitrogen atom or the like can be used.

As said water-soluble dye, for examples, an acid dye and a direct dye can be suitably used. Note that, in general, at least one of $-SO_3M$ and $-COOM$, wherein M is H, $NH_4$, an alkali metal or the like, is contained in said water-soluble acid dye or direct dye in order to give hydrophilic property.

As said humectant, polyhydric alcohols such as glycerol, water-soluble nitrogen-containing heterocyclic compounds such as 2-pyrrolidone and N-methyl-2-pyrrolidone and the like can be suitably used.

As said penetrant, monoalkyl ethers of polyhydric alcohols such as diethylene glycol monobutyl alcohol can be suitably used. In that case, the content of the monoalkyl ether of a polyhydric alcohol is preferably 1 to 50% by mass with respect to the mass of the whole ink. If said content is less than 1%, sufficient effect to cause the ink to penetrate into a recording paper will not be obtained. On the other hand, if said content is more than 50%, the solubility of the dye and the silane compound in water will be lowered.

Said silane compound serves to improve the water-resistivity of the ink. Specifically, when the ink droplets ejected from the nozzle 14 in the ink jet head 1 attached to the recording paper 41, water in the ink droplets evaporate or penetrate into the recording paper 41. Then, the silane compound in the ink droplets gives rise to a condensation and polymerization reaction to surround the part or whole of the dye molecules. Accordingly, the dye is prevented from dissolving out into water even the images on the recording paper 41 are getting wet with water.

Figure 5:
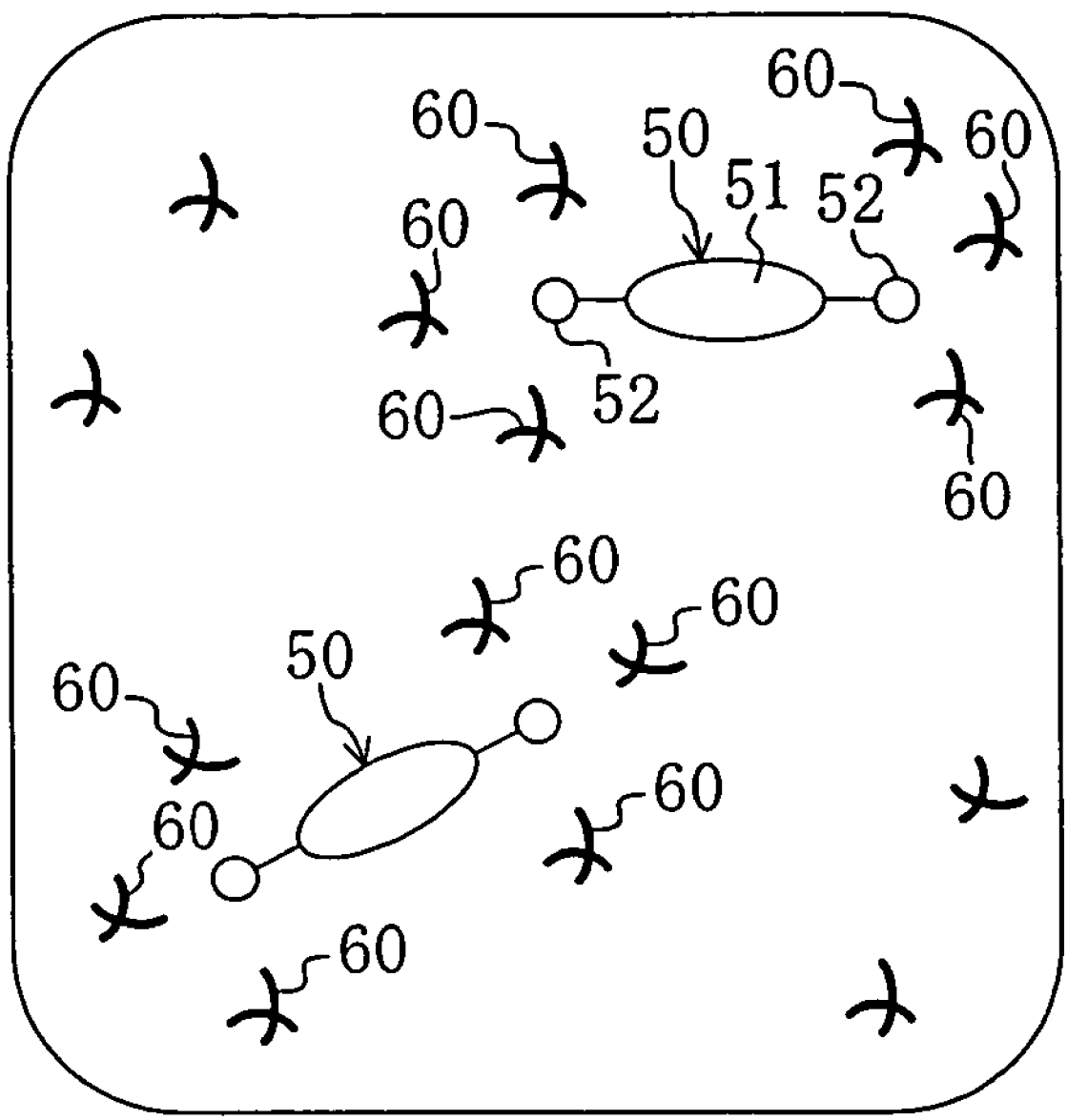
FIG. 5 is a conceptive view illustrating the main components of the ink.

Concretely, as shown in FIG. 5, the molecules of the silane compounds (hereinafter, referred to as "silane molecules") 60 are hydrolyzed and dissolved in the ink before the ejection of the ink from the ink jet head 1 is carried out. Reference numeral 50 in FIG. 5 denotes the dye molecule, and the dye molecule 50 includes a hydrophobic group 51 and hydrophilic groups 52. The hydrophilic groups 52 are different from each other depending on the type of the dye, and $-SO_3H$, $-SO_3M$, $-OSO_3H$, $-OSO_3M$, $-COOH$, $-COOM$, $-NR_3X$, $-OH$, $-NH_2$, $-NHCONH_2$, and $-(OCH_2CH_2)_n$, wherein M is alkali metal or $-NH_4$, R is alkyl, and X is halogen, may be used as the hydrophilic group. As shown in FIG. 5, in the ink system, the silane molecules 60 are gathering in loose binding state by the effect of the molecular interaction in the proximity of the hydrophilic groups 52 of the dye molecules 50. It is supposed that said gathering is resulted from the reciprocal attraction between amino groups in the silane molecules and sulfone groups or carboxyl groups in the dye molecules induce by Coulomb force. Also, in the ink system, the silane molecules exist apart from each other in relatively far distance since the silane molecules are neutralized with water that is consisted of polar molecules as well as the dye molecules. Accordingly, no gel formation is produced in the ink system.

Figure 6:
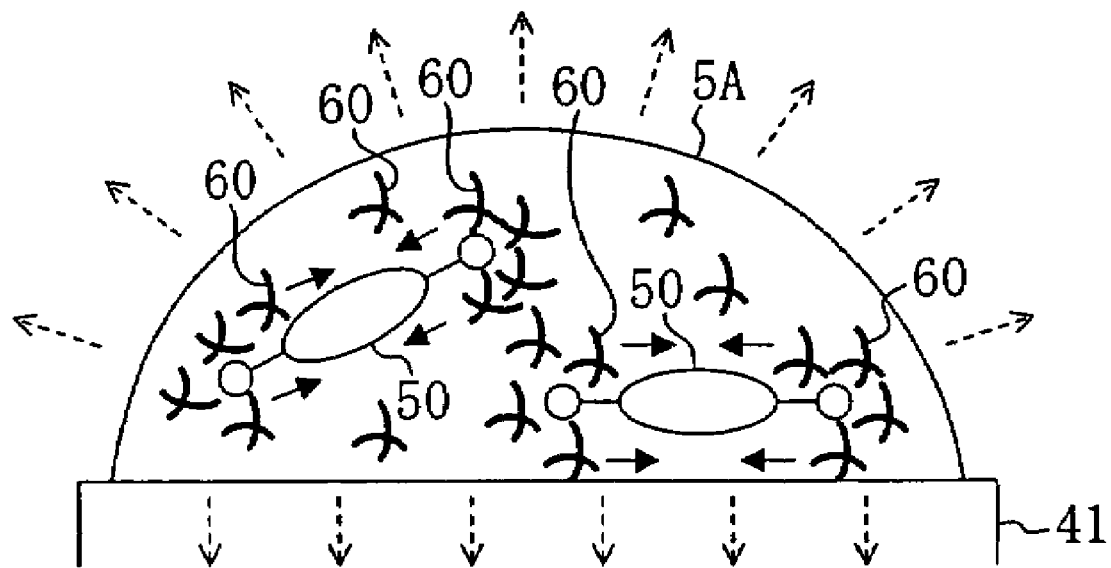
FIG. 6 is a conceptive view of ink droplets when they are attached onto a recording medium.
Figure 7:
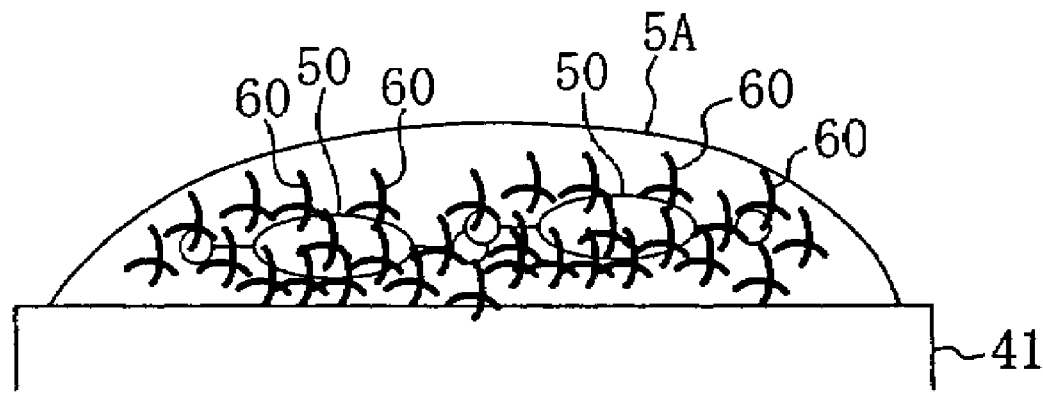
FIG. 7 is a conceptive view of ink droplets when water is evaporated or penetrated into a recording medium.

As shown in FIG. 6, the ink 5 ejected from the nozzle 14 is shot onto the recording paper 41 in the form of the ink droplets 5A. It is difficult for the dye molecules 50 and the silane molecules 60 contained in the ink droplets 5A to pass through the three-dimensional network structure of the recording paper comparing to molecules of a solvent (water) because the molecules of the dye and the silane compound have particle sizes larger than those of the solvent. Further, it is presumed that, because of polarities of the dye and silane compound, the interaction such as hydrogen bond generated between them and cellulose, that is the main component of the recording paper, is stronger than the interaction generated between them and the solvent. That is, when the ink penetrates into the recording paper 41, the dye molecules 50 and the silane molecules 60 are absorbed to the cellulose. Since the cellulose serves as a filter, the diffuse speed of the silane molecules 60 into the recording paper gets slow than that of the solvent. Accordingly, only the dye molecules 50 and the silane molecules 60 remain in the ink on the recording paper, so that their presence in the ink becomes relatively greater. In such a state, the intermolecular distance between the silane molecules gets shorter, whereby the condensation and polymerization reaction is quickly taken place. As described above, this condensation and polymerization reaction starts from the proximity of the hydrophilic groups 52 of the dye molecules 50 since the silane molecules 60 are gathering around the proximity of the hydrophilic groups 52 of the dye molecules 50 because of the molecular interaction (See FIG. 6). This effect can be expedited by means of reducing the surface tension of the ink (reducing the surface tension of the solvent), that is, increasing the diffuse speed of the solvent. By way of increasing the diffuse speed of the solvent, the silane molecules are allowed to surround only the whole hydrophilic groups. On the other hand, by way of reducing the diffuse speed of the solvent, the silane molecules are allowed to surround the whole dye molecules (See FIG. 7). In the above-described manner, the inventor has found out that the region surrounding the silane molecules can be controlled by way of controlling the surface tension of the ink.

Figure 8:
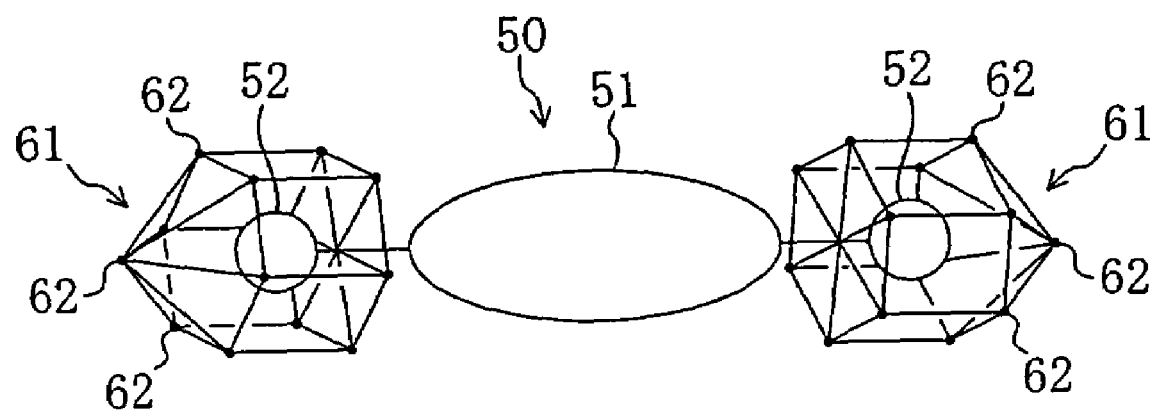
FIG. 8 is a conceptive view illustrating a state where the whole hydrophilic groups in the dye molecules are surrounded by silicon atoms.

In the ink according to the first embodiment, the content of the silane compound is set such that the ink contains silicon atoms at a ratio of 3.3 or more with respect to one hydrophilic group of the dye molecules. This setting of the content is for surrounding at least the whole hydrophilic groups 52 of the respective dye molecules with the networks 61 of the silicon atoms 62, as shown in FIG. 8. In other words, it is for including the hydrophilic group 52 of the dye molecule 50 as the guest with the networks 61 of the silicon atoms 62 that serve as the host.

By way of surrounding at least the hydrophilic groups 52 of the respective dye molecules 50 with silicon atoms 62 as described above, the dye molecules will not be drawn to water. Accordingly, the dye is prevented from dissolving out into water even when the images formed on the recording paper 41 are getting wet with water. That is to say, the water-resistivity of the images is improved.

The required content for the silane compound does not depend on the size of the dye molecule, but it depends on mainly the number of the hydrophilic groups in the dye molecules. In order to surround the whole hydrophilic group with the networks of silicon atoms, 4 or more silicon atoms are theoretically required for one hydrophilic group. Because, in order to surround the whole hydrophilic group, it is required to form the network in which silicon atoms position at each of the apexes of a polyhedron more than a tetrahedron. Therefore, it is preferable that the ink contains silicon atoms at a ratio of 4 or more with respect to one hydrophilic group. As will be described later in Examples, however, if silicon atoms present in the ink at a ratio of 3.3 or more with respect to one hydrophilic group, substantial improvement in the water-resistivity of the formed images can be obtained.

In the foresaid ink, silicon atoms may be contained at a ratio of 6.4 or more with respect to one molecule of the dye. In this case, the networks 61 of silicon atoms 62 surround the whole molecule of the dye, namely both hydrophobic group 51 and hydrophilic group 52. In other words, the whole molecule of the dye is included in the networks 61 of silicon atoms 62. With such an inclusion, the water-resistivity of the formed images is further improved.

Note that, in order to surround the whole molecule of the dye with the networks 61 of silicon atoms 62, 8 or more silicon atoms 62 are theoretically required for one molecule of the dye. Therefore, it is more preferable that silicon atoms 62 are contained at a ratio of 8 or more with respect to one dye molecule in the ink. In this case, since the whole molecule of the dye 50 is surrounded with silicon atoms, the required content for the silane compound depends on the size of the dye molecule 50. As will be described later in Examples, however, if silicon atoms present in the ink at a ratio of 6.4 or more with respect to one dye molecule, it is generally possible to obtain substantially the same effect as that obtainable when the whole dye molecules 50 are surrounded with silicon atoms.

Alternatively, the ink may contain silicon atoms at a ratio of 20 or more with respect to one molecule of the dye. In this case, the networks of the silicon atoms surround the whole molecule of the dye in double layers. Accordingly, the dye molecules on the recording paper are protected thoroughly with the silane compound, whereby not only the water-resistivity but also the friction-resisting property of the ink on the recording paper can be improved.

Figure 9:
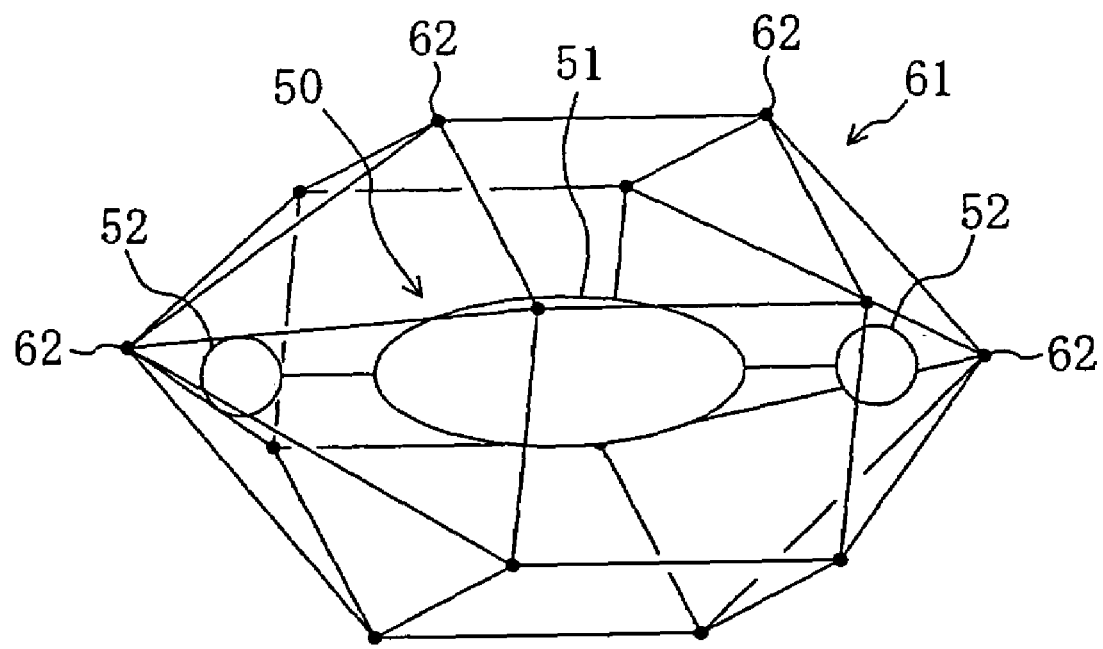
FIG. 9 is a conceptive view illustrating a state where the whole dye molecules are surrounded by silicon atoms.
Figure 10:
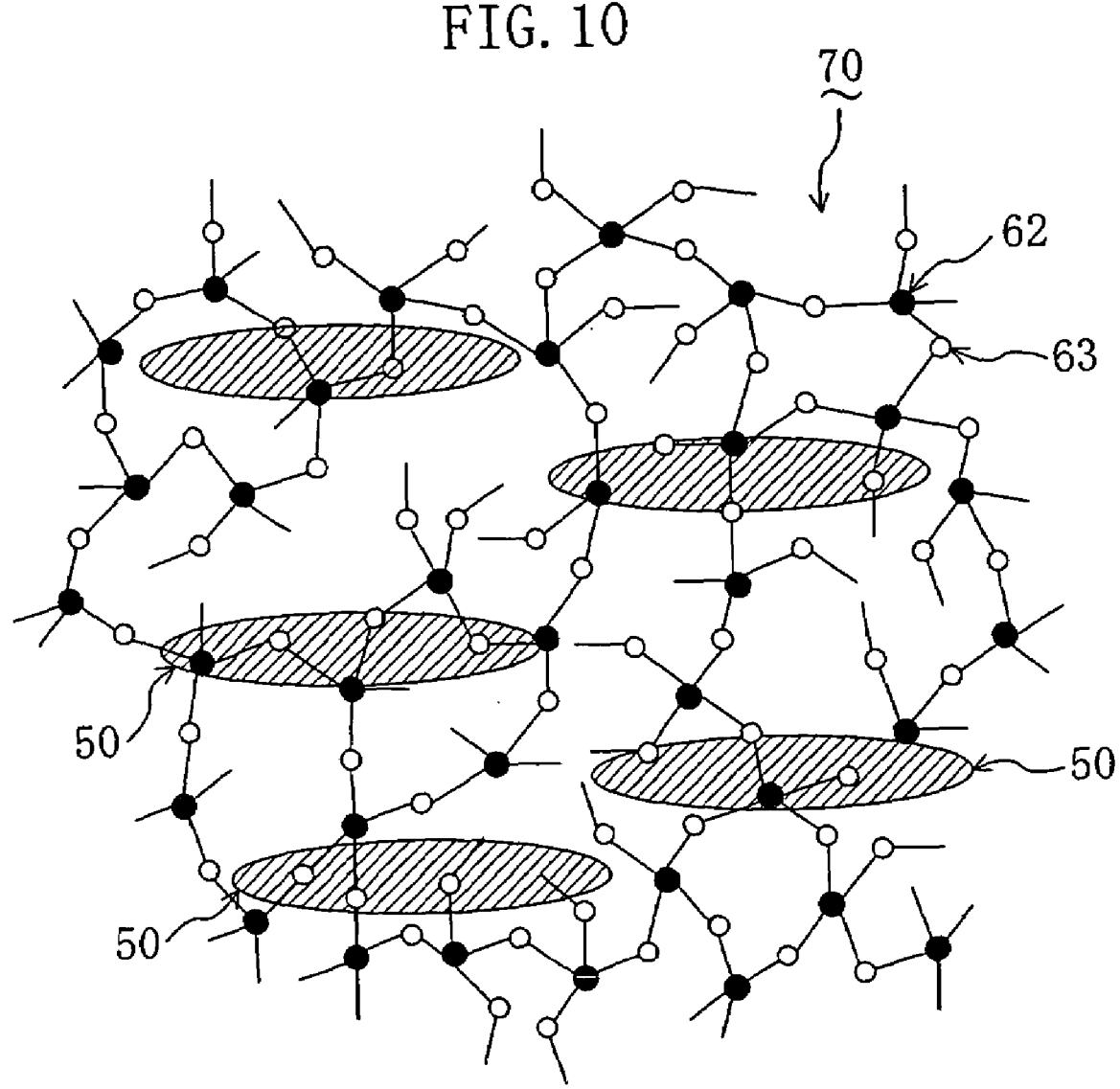
FIG. 10 is a model view illustrating a state of molecules of a silane compound and the dye molecules when an ideal condensation and polymerization reaction has been effectuated.
Figure 11:
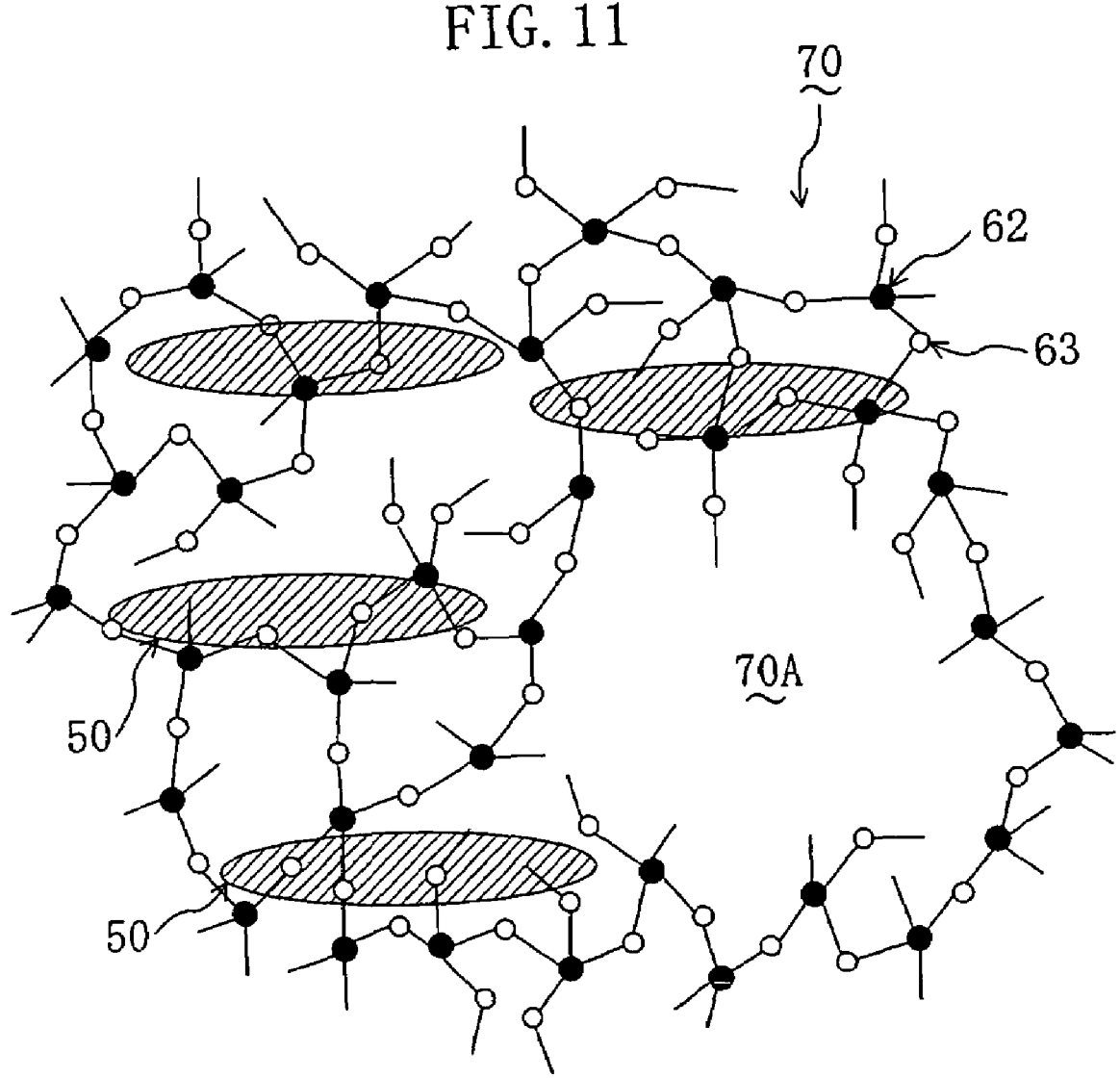
FIG. 11 is a model view illustrating an actual state of molecules of a silane compound and the dye molecules.

Besides, the solvent contained in the ink is required to be evaporated or penetrated into the recording paper quickly to permit the silicon atoms to include at least the hydrophilic group of the dye molecule. Therefore, in the first embodiment, the surface tension of the ink was made less in order to improve the penetration speed of the solvent into the recording paper. Specifically, the surface tension of the ink at 25° C. was set to a range from 20 mN/m to 50 mN/m (from 20, dyn/cm to 50 dyn/cm). Note that the surface tension is preferably 40 mN/m (40 dyn/cm) or less in order to include only the hydrophilic group of the dye molecule into the silicon atoms (See FIG. 8). On the other hand, the surface tension is preferably 50 mN/m (50 dyn/cm) or less in order to include the whole dye molecule into the silicon atoms (See FIG. 9) since it is preferable to take time for carrying out the condensation and polymerization reaction.

It is particularly preferable to add fluoroalkyl monoalcohol having a boiling point of 100° C. or lower for reducing the surface tension of the ink.

Since the ink according to this invention is used for an ink jet recording system, the ink should have some ejecting performance. Therefore, in view of assuring stable flying of the ink droplets, it is preferable to adjust the surface tension of the ink to a range more than 20 mN/m (20 dyn/cm). Further, the viscosity of the ink is preferably 8 cP or less at 25° C.

As described above, with the ink according to the first embodiment, recording of images with water-resistivity and high printing and image quality can be obtained on a common recording paper. In addition, long-term preservation stability of the recorded images can be improved with the ink according to this embodiment.

Note that, in the first embodiment, a hydrolyzable silane compound was contained as a hydrolyzable organic silicon compound that gives rise to the condensation and polymerization reaction under a condition without water. However, any organic silicon compound can be used in the present invention if said organic silicon compound is one that can gives rise to the condensation and polymerization reaction to thereby surround either the part or the whole of the dye molecule when the ink droplets ejected from the nozzle 14 in the ink jet head 1 have attached onto the recording paper 41 and water contained in the ink has evaporated or penetrated into the recording paper.

Next, concrete examples for carrying out the first embodiment are explained below.

First of all, 33 types of inks for ink jet recording use with compositions as described below, wherein the contents of the respective compositions are expressed with % by mass, were prepared (Comparative Examples A1 to A3, Examples A1 to A13, Comparative Examples B1 to B3, and Examples B1 to B14). Each of the inks prepared in Examples A1 to A13 contains silicon atoms at a ratio of 3.3 or more with respect to one hydrophilic group of the dye molecule, and each of the inks prepared in Examples B1 to B14 contains silicon atoms at a ratio of 6.4 or more with respect to one molecule of the dye.

Note that glycerol serving as the humectant and diethylene glycol monobutyl ether serving as the penetrant were respectively contained in the ink in Comparative Examples A1 to A3, Examples A1 to A13, Comparative Examples B1 and B2, and Examples B1 to B14. As the dye, C.I. acid black 2 was used. Though omitting explanation, even when other dyes such as yellow, magenta and cyan are used, the similar results may be obtained.

The organic silicon compound is prepared according to the process described below. That is, to 100 g (0.56 mol) of $H_2NCH_2CH_2CH_2Si(OCH_3)_3$ placed in a container was added 49 g (0.66 mol) of 3-epoxy-1-propanol drop by drop. Following to the dropping of the whole quantity, the mixture was stirred for 5 hours at 80° C. to give rise to a reaction of the amino groups and epoxy groups contained in the above-described compounds. After the reaction, a hydrolyzable silane compound was obtained. Then, to another container was added a mixture consisting of 120 g (6.67 mol) of water, 50.6 g (0.2 mol) of said hydrolyzable silane compound and 15.2 g (0.1 mol) of Si(OCH3)4 drop by drop. Following to the dropping of the whole quantity, the mixture was kept in reaction for an hour at 60° C. to thereby obtain the organic silicon compound, which is used in the Examples. Hereinafter, the organic silicon compound prepared according to the above-described process is designated as "organic silicon compound A".

COMPARATIVE EXAMPLE A1

| | |
|---|---|
| C.I. acid black 2 | 5% |
| Glycerol | 10% |
| Diethylene glycol monobutyl ether | 10% |
| Organic silicon compound A | 5.4% |
| Pure water | 69.6% |
| Number of silicon atoms vs one hydrophilic group | 3.0 |

COMPARATIVE EXAMPLE A2

| | |
|---|---|
| C.I. acid black 2 | 5% |
| Glycerol | 10% |
| Diethylene glycol monobutyl ether | 10% |
| Organic silicon compound A | 5.6% |
| Pure water | 69.4% |
| Number of silicon atoms vs one hydrophilic group | 3.1 |

COMPARATIVE EXAMPLE A3

| | |
|---|---|
| C.I. acid black 2 | 5% |
| Glycerol | 10% |
| Diethylene glycol monobutyl ether | 10% |
| Organic silicon compound A | 5.8% |
| Pure water | 69.2% |
| Number of silicon atoms vs one hydrophilic group | 3.2 |

Example A1

| | |
|---|---|
| C.I. acid black 2 | 5% |
| Glycerol | 10% |
| Diethylene glycol monobutyl ether | 10% |
| Organic silicon compound A | 5.9% |
| Pure water | 69.1% |
| Number of silicon atoms vs one hydrophilic group | 3.3 |

Example A2

| | |
|---|---|
| C.I. acid black 2 | 5% |
| Glycerol | 10% |
| Diethylene glycol monobutyl ether | 10% |
| Organic silicon compound A | 6.1% |
| Pure water | 68.9% |
| Number of silicon atoms vs one hydrophilic group | 3.4 |

Example A3

| | |
|---|---|
| C.I. acid black 2 | 5% |
| Glycerol | 10% |
| Diethylene glycol monobutyl ether | 10% |
| Organic silicon compound A | 6.3% |
| Pure water | 68.7% |
| Number of silicon atoms vs one hydrophilic group | 3.5 |

Example A4

| | |
|---|---|
| C.I. acid black 2 | 5% |
| Glycerol | 10% |
| Diethylene glycol monobutyl ether | 10% |
| Organic silicon compound A | 6.5% |
| Pure water | 68.5% |
| Number of silicon atoms vs one hydrophilic group | 3.6 |

Example A5

| | |
|---|---|
| C.I. acid black 2 | 5% |
| Glycerol | 10% |
| Diethylene glycol monobutyl ether | 10% |
| Organic silicon compound A | 6.7% |
| Pure water | 68.3% |
| Number of silicon atoms vs one hydrophilic group | 3.7 |

Example A6

| | |
|---|---|
| C.I. acid black 2 | 5% |
| Glycerol | 10% |
| Diethylene glycol monobutyl ether | 10% |
| Organic silicon compound A | 6.8% |
| Pure water | 68.2% |
| Number of silicon atoms vs one hydrophilic group | 3.8 |

Example A7

| | |
|---|---|
| C.I. acid black 2 | 5% |
| Glycerol | 10% |
| Diethylene glycol monobutyl ether | 10% |
| Organic silicon compound A | 7% |
| Pure water | 68% |
| Number of silicon atoms vs one hydrophilic group | 3.9 |

Example A8

| | |
|---|---|
| C.I. acid black 2 | 5% |
| Glycerol | 10% |
| Diethylene glycol monobutyl ether | 10% |
| Organic silicon compound A | 7.2% |
| Pure water | 67.8% |
| Number of silicon atoms vs one hydrophilic group | 4 |

Example A9

| | |
|---|---|
| C.I. acid black 2 | 5% |
| Glycerol | 10% |
| Diethylene glycol monobutyl ether | 10% |
| Organic silicon compound A | 10.8% |
| Pure water | 64.2% |
| Number of silicon atoms vs one hydrophilic group | 6 |

Example A10

| | |
|---|---|
| C.I. acid black 2 | 5% |
| Glycerol | 10% |
| Diethylene glycol monobutyl ether | 10% |
| Organic silicon compound A | 12.1% |
| Pure water | 62.9% |
| Number of silicon atoms vs one hydrophilic group | 7.5 |

-continued
Example A11

| | |
|---|---|
| C.I. acid black 2 | 5% |
| Glycerol | 10% |
| Diethylene glycol monobutyl ether | 10% |
| Organic silicon compound A | 16.1% |
| Pure water | 58.9% |
| Number of silicon atoms vs one hydrophilic group | 7.5 |

Example A12

| | |
|---|---|
| C.I. acid black 2 | 5% |
| Glycerol | 10% |
| Diethylene glycol monobutyl ether | 10% |
| Organic silicon compound A | 24.1% |
| Pure water | 50.9% |
| Number of silicon atoms vs one hydrophilic group | 15 |

Example A13

| | |
|---|---|
| C.I. acid black 2 | 5% |
| Glycerol | 10% |
| Diethylene glycol monobutyl ether | 10% |
| Organic silicon compound A | 32.2% |
| Pure water | 42.8% |
| Number of silicon atoms vs one hydrophilic group | 20 |

COMPARATIVE EXAMPLE B1

| | |
|---|---|
| C.I. acid black 2 | 5% |
| Glycerol | 10% |
| Diethylene glycol monobutyl ether | 5% |
| Organic silicon compound A | 4.3% |
| Pure water | 75.7% |
| Number of silicon atoms vs one dye molecule | 6 |

COMPARATIVE EXAMPLE B2

| | |
|---|---|
| C.I. acid black 2 | 5% |
| Glycerol | 10% |
| Diethylene glycol monobutyl ether | 5% |
| Organic silicon compound A | 4.5% |
| Pure water | 75.5% |
| Number of silicon atoms vs one dye molecule | 6.2 |

EXAMPLE B1

| | |
|---|---|
| C.I. acid black 2 | 5% |
| Glycerol | 10% |
| Diethylene glycol monobutyl ether | 5% |
| Organic silicon compound A | 4.6% |
| Pure water | 75.4% |
| Number of silicon atoms vs one dye molecule | 6.4 |

EXAMPLE B2

| | |
|---|---|
| C.I. acid black 2 | 5% |
| Glycerol | 10% |
| Diethylene glycol monobutyl ether | 5% |
| Organic silicon compound A | 4.8% |
| Pure water | 75.2% |
| Number of silicon atoms vs one dye molecule | 6.6 |

EXAMPLE B3

| | |
|---|---|
| C.I. acid black 2 | 5% |
| Glycerol | 10% |
| Diethylene glycol monobutyl ether | 5% |
| Organic silicon compound A | 4.9% |
| Pure water | 75.1% |
| Number of silicon atoms vs one dye molecule | 6.8 |

EXAMPLE B4

| | |
|---|---|
| C.I. acid black 2 | 5% |
| Glycerol | 10% |
| Diethylene glycol monobutyl ether | 5% |
| Organic silicon compound A | 5% |
| Pure water | 75% |
| Number of silicon atoms vs one dye molecule | 7 |

EXAMPLE B5

| | |
|---|---|
| C.I. acid black 2 | 5% |
| Glycerol | 10% |
| Diethylene glycol monobutyl ether | 5% |
| Organic silicon compound A | 5.2% |
| Pure water | 74.8% |
| Number of silicon atoms vs one dye molecule | 7.2 |

EXAMPLE B6

| | |
|---|---|
| C.I. acid black 2 | 5% |
| Glycerol | 10% |
| Diethylene glycol monobutyl ether | 5% |
| Organic silicon compound A | 5.3% |
| Pure water | 74.7% |
| Number of silicon atoms vs one dye molecule | 7.4 |

EXAMPLE B7

| | |
|---|---|
| C.I. acid black 2 | 5% |
| Glycerol | 10% |
| Diethylene glycol monobutyl ether | 5% |
| Organic silicon compound A | 5.5% |
| Pure water | 74.5% |
| Number of silicon atoms vs one dye molecule | 7.6 |

EXAMPLE B8

| | |
|---|---|
| C.I. acid black 2 | 5% |
| Glycerol | 10% |
| Diethylene glycol monobutyl ether | 5% |
| Organic silicon compound A | 5.6% |
| Pure water | 74.4% |
| Number of silicon atoms vs one dye molecule | 7.8 |

EXAMPLE B9

| | |
|---|---|
| C.I. acid black 2 | 5% |
| Glycerol | 10% |
| Diethylene glycol monobutyl ether | 5% |
| Organic silicon compound A | 5.8% |
| Pure water | 74.2% |
| Number of silicon atoms vs one dye molecule | 8 |

EXAMPLE B10

| | |
|---|---|
| C.I. acid black 2 | 5% |
| Glycerol | 10% |
| Diethylene glycol monobutyl ether | 5% |
| Organic silicon compound A | 8.6% |
| Pure water | 71.4% |
| Number of silicon atoms vs one dye molecule | 12 |

EXAMPLE B11

| | |
|---|---|
| C.I. acid black 2 | 5% |
| Glycerol | 10% |
| Diethylene glycol monobutyl ether | 5% |
| Organic silicon compound A | 10.8% |
| Pure water | 69.2% |
| Number of silicon atoms vs one dye molecule | 15 |

EXAMPLE B12

| | |
|---|---|
| C.I. acid black 2 | 5% |
| Glycerol | 10% |
| Diethylene glycol monobutyl ether | 5% |
| Organic silicon compound A | 14.4% |
| Pure water | 65.6% |
| Number of silicon atoms vs one dye molecule | 20 |

EXAMPLE B13

| | |
|---|---|
| C.I. acid black 2 | 5% |
| Glycerol | 10% |
| Diethylene glycol monobutyl ether | 5% |
| Organic silicon compound A | 21.6% |
| Pure water | 58.4% |
| Number of silicon atoms vs one dye molecule | 30 |

-continued

EXAMPLE B14

| | |
|---|---|
| C.I. acid black 2 | 5% |
| Glycerol | 10% |
| Diethylene glycol monobutyl ether | 5% |
| Organic silicon compound A | 28.8% |
| Pure water | 51.2% |
| Number of silicon atoms vs one dye molecule | 40 |

COMPARATIVE EXAMPLE B3

| | |
|---|---|
| Chlorazol black LF (Manufactured by Tokyo Kasei Co., Ltd.) | 5% |
| Glycerol | 10% |
| Organic silicon compound A | 5% |
| Pure water | 80% |
| Number of silicon atoms vs one dye molecule | 6.2 |

Next, images were formed on a plain paper (Trade name, "Xerox 4024": Manufactured by Xerox Inc.) with the respective inks prepared in the above Examples and Comparative Examples by means of a commercialized printer, which is a type for ejecting the ink by means of a piezoelectric actuator that is same as one of the above embodiment except the thickness of a piezoelectric element being significantly larger than that of the above embodiment. Then, the sheet on which said images were formed is immersed in pure water, followed by leaving at room temperature for drying, and then checked for the occurrence of bleeding of the images (Water-resistivity performance test). Further, examinations were made on if the respective inks were released in desired forms of droplets from the ink jet head or not, and if the ink droplets were formed in desired shape and size or not (Release stability test). Further, following to leaving the sheets on which the images were formed under an atmosphere of 70° C. for three months, the respective inks were checked for the generation of their cohesion and precipitation (Stability test). The results on the above-described tests were presented in Tables 1 and 2.

The reference symbols "⊙", "◯" and "Δ" denote "excellent", "good" and "acceptable", respectively, as the evaluation ranks of the results.

TABLE 1

| | Water-resistivity Test | Stability Test | Release Stability Test |
|---|---|---|---|
| Comparative Example A1 | Δ | ◯ | ◯ |
| Comparative Example A2 | Δ | ◯ | ◯ |
| Comparative Example A3 | Δ | ◯ | ◯ |
| Example A1 | ◯ | ◯ | ◯ |
| Example A2 | ◯ | ◯ | ◯ |
| Example A3 | ◯ | ◯ | ◯ |
| Example A4 | ◯ | ◯ | ◯ |
| Example A5 | ◯ | ◯ | ◯ |
| Example A6 | ◯ | ◯ | ◯ |
| Example A7 | ⊙ | ◯ | ◯ |
| Example A8 | ⊙ | ◯ | ◯ |
| Example A9 | ⊙ | ◯ | ◯ |
| Example A10 | ⊙ | ◯ | ◯ |
| Example A11 | ⊙ | ◯ | ◯ |
| Example A12 | ⊙ | ◯ | Δ |
| Example A13 | ⊙ | ◯ | Δ |

TABLE 2

| | Water-resistivity Test | Stability Test | Release Stability Test |
|---|---|---|---|
| Comparative Example B1 | Δ | ◯ | ◯ |
| Comparative Example B2 | Δ | ◯ | ◯ |
| Comparative Example B3 | Δ | ◯ | ◯ |
| Example B1 | ◯ | ◯ | ◯ |
| Example B2 | ◯ | ◯ | ◯ |
| Example B3 | ◯ | ◯ | ◯ |
| Example B4 | ◯ | ◯ | ◯ |
| Example B5 | ◯ | ◯ | ◯ |
| Example B6 | ◯ | ◯ | ◯ |
| Example B7 | ◯ | ◯ | ◯ |
| Example B8 | ⊙ | ◯ | ◯ |
| Example B9 | ⊙ | ◯ | ◯ |
| Example B10 | ⊙ | ◯ | ◯ |
| Example B11 | ⊙ | ◯ | ◯ |
| Example B12 | ⊙ | ◯ | ◯ |
| Example B13 | ⊙ | ◯ | Δ |
| Example B14 | ⊙ | ◯ | Δ |

From the above results, the effects of the respective Examples described above were confirmed.

Second Embodiment

The ink according to the second embodiment comprises a dye, a humectant, a penetrant, water and a hydrolyzable silane compound as a water-soluble substance that gives rise to a condensation and polymerization reaction under a condition without water as well as the ink according to the first embodiment. The ink of the second embodiment further contains a multimer-forming substance that converts the dye molecules into their multimers.

The silane compound, the dye, the humectant, and the penetrant are as defined above, and therefore, explanations on them are omitted here.

Said multimer-forming substance forms hydrogen bonds, ionic bonds or covalent bonds with the dye molecules to thereby convert the dye molecules into their multimers. When the dye is either an acid dye or a direct dye, the multimer-forming substance is preferably an organic diamine or an organic triamine. When the organic diamine is contained in the ink, the dye molecules are converted into their dimers, and besides, when the organic triamine is contained in the ink, the dye molecules are converted into their trimers. Further, considering the binding ability with the dye molecules, the organic diamine or the organic triamine is preferably a primary amine having strong basicity. Examples of the organic diamine include diaminomethane, ethylene diamine, 1,3-diaminopropane, 1,4-diaminobutane, 1,5-diaminopentane, 1,6-diaminohexane, 1,7-diaminoheptane, and others. Besides, examples of the organic triamine include methane triamine (See chemical formula 1), propane-1,2,3-triamine (See chemical formula 2), 2-aminomethylpropane-1,3-diamine (See chemical formula 3), 3-(2-aminoethyl)pentane-1,5-diamine (See chemical formula 4) and others.

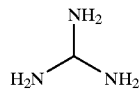

Chemical Formula 1

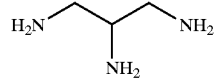

Chemical Formula 2

-continued

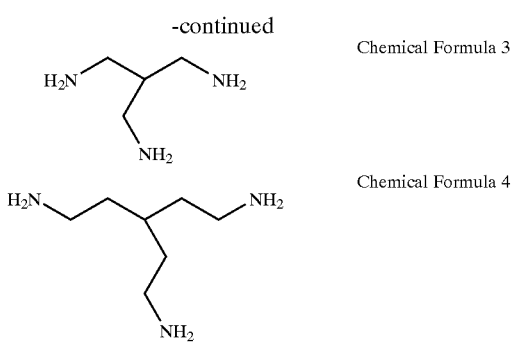

Chemical Formula 3

Chemical Formula 4

The content of the organic diamine may be set such that the ink contains the molecules of said diamine at a ratio of 0.5 with respect to one molecule of the dye, when the bonding between the molecules of the organic diamine and the molecules of the dye is made ideally, that is all of the molecules of the organic diamine are bonded with the dye molecules. However, considering the case of the presence of the organic diamine molecules which do not bond with the dye molecules, it is desirable to set the foresaid ratio to a range from 0.5 to 1 with respect to one molecule of the dye. Similarly, the content of the organic triamine may be set such that the ink contains the molecules of said triamine at a ratio of one third with respect to one molecule of the dye, when the bonding between the molecules of the organic triamine and the molecules of dye is made ideally. However, considering the case of the presence of the organic triamine molecules which do not bond with the dye molecules, it is desirable to set the foresaid ratio to a range from one third to 1 with respect to one molecule of the dye.

The preparation of the ink of this embodiment is preferably done according to the following process. Specifically, to water was added the dye and the organic amine (either organic diamine or organic triamine), and the mixture was thoroughly stirred at 60 to 70° C. Then, to the mixture were added the humectant and the penetrant, followed by thorough stirring of the mixture. Then, to the mixture was added said silane compound, followed by thorough stirring of the mixture to obtain the ink. By taking the above-described procedure, the molecules of the dye and the molecules of the organic amine can bond previously with each other, though they are weak bonds (because of the presence of water, the dye molecule and the organic amine can form only weak bonds). Accordingly, when the ink attaches onto the recording paper 41 and water contained in the ink evaporates or penetrates into the recording paper, said dye molecules and organic amine having formed said weak bonds form hydrogen bonds, ionic bonds or covalent bonds with each other. In this manner, the dye molecules can be surely converted into their dimers or trimers. For example, if the silane compound and the dye were added to water previously and then adding the organic amine to the same, the bonding between the organic amine and the dye molecules is disturbed by the silane compound, whereby the conversion of the dye molecules into the dimers or trimers is disabled.

Figure 12:
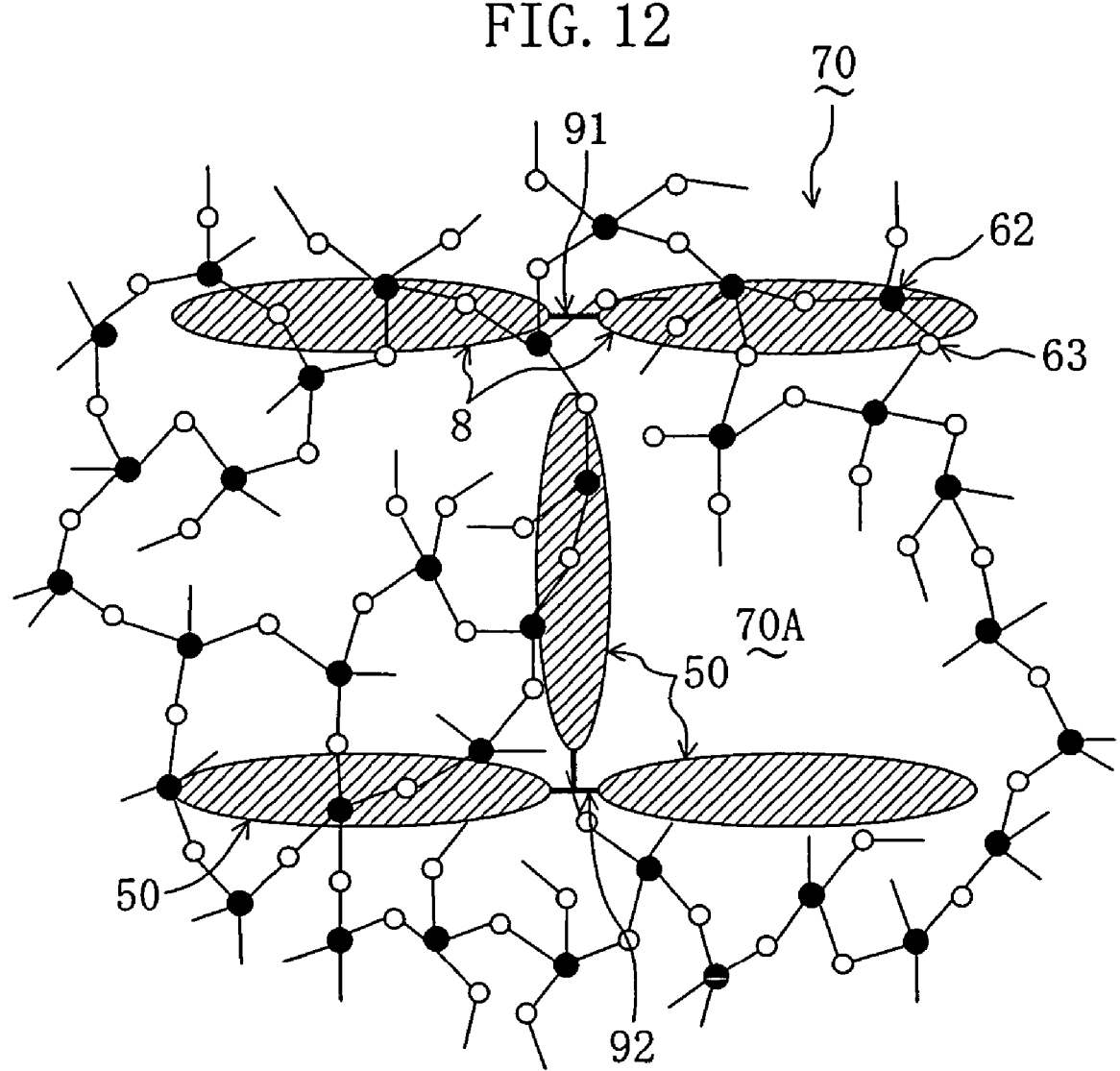
FIG. 12 is a model view illustrating a state of molecules of a silane compound and the dye molecules when the dye molecules are converted into their multimers.

As described above, the ink for ink jet recording use according to the second embodiment comprises either an acid dye or a direct dye, a humectant, a penetrant, water and a hydrolyzable silane compound as a water-soluble substance that gives rise to a condensation and polymerization reaction under a condition without water. Therefore, as shown in FIG. 12, when the ink droplets attach onto the recording paper 41 and water (solvent) in the ink evaporates or penetrates into the recording paper 41, the silane compound remained on the recording paper 41 gives rise ro the condensation and polymerization reaction to form network structures 70 that surround the dye molecules 50. At this stage, since the ink contains the organic diamine 91 or the organic triamine 92 serving as the multimer-forming substance that converts the dye molecules 50 into their multimers, the dye molecules 50 are converted into their multimers by the organic diamine 91 or the organic triamine 92 Accordingly, even if a defective portions 70A exist in the network structure 70 of the silane compound, and even if the images formed on the recording paper 41 are getting wet with water, the dye molecules will never be dissolved out into water because the sizes of the dimers and the trimers of the dye molecules 50 are larger than the size of the defective portions 70A. As a result, the water-resistivity of the images can be greatly improved.

Though the silane compound was contained in the ink as the water-soluble substance that gives rise to the condensation and polymerization reaction under a condition without water in the second embodiment as well as the first embodiment, any substance may be used without limitation to silane compounds if it can give rise to the condensation and polymerization reaction to thereby surround the dye molecules when the ink droplets ejected through the nozzle 14 of the ink jet head 1 attached onto the recording paper 41 and water (solvent) in the ink evaporated or penetrated into the recording paper 41.

Further, though an acid dye or a direct dye was used as the dye in the second embodiment, basic dyes may be used as the dye as well. In this case, however, unlike the second embodiment, an organic diamine or an organic triamine is not used as the multimer-forming substance, and it is preferable to use dicarboxylic acid or tricarboxylic acid as the multimer-forming substance. Examples of the basic dye include C.I. basic yellow 1 (See chemical formula 5), C.I. basic blue 9 (See chemical formula 6), C.I. basic red 9 (See chemical formula 7), C.I. basic black 2 (See chemical formula 8), and others.

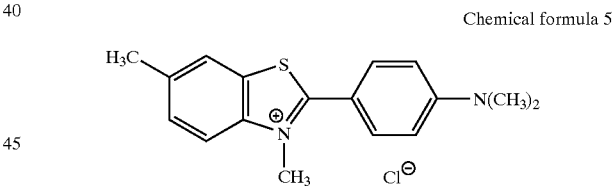

Chemical formula 5

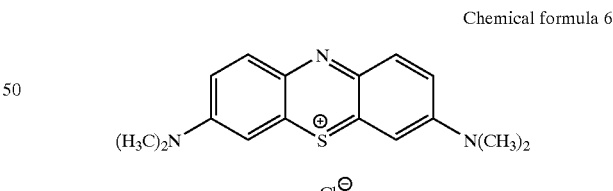

Chemical formula 6

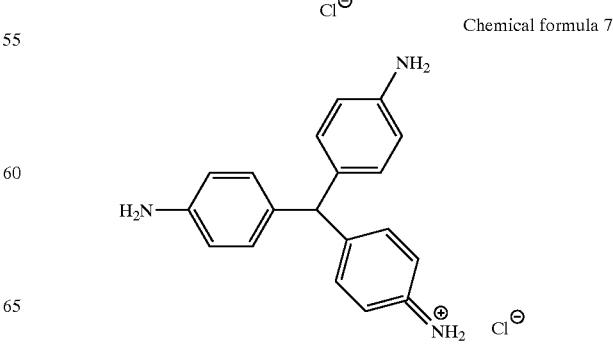

Chemical formula 7

Chemical formula 8

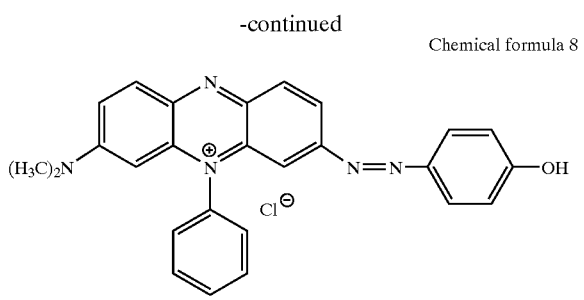

Further, examples of the dicarboxylic acid include malonic acid (See chemical formula 9), succinic acid (See chemical formula 10), pentanedioic acid (See chemical formula 11), hexanedioic acid (See chemical formula 12), and others. Examples of the tricarboxylic acid include 2-carboxy-malonic acid (See chemical formula 13), 3-carboxy-pentanedioic acid (See chemical formula 14), 3-carboxymethyl-pentanedioic acid (See chemical formula 15), 3-carboxymethyl-hexenedioic acid (See chemical formula 16), and others.

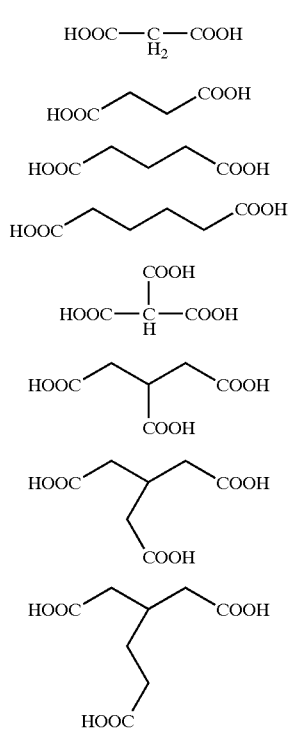

Chemical formula 9

Chemical formula 10

Chemical formula 11

Chemical formula 12

Chemical formula 13

Chemical formula 14

Chemical formula 15

Chemical formula 16

Next, explanation is made on the concrete examples of the second embodiments in the following.

Firstly, 14 types of inks for ink jet recording use having the compositions as illustrated below were prepared (Examples C1 to C14). Note that the contents of the respective compositions are expressed in % by mass.

In the Examples C1 to C14, glycerol was used as the humectant and diethylene glycol monobutyl ether was used as the penetrant. Further, an organic silicon compound was contained in the ink as the water-soluble substance that gives rise to the condensation and polymerization reaction under a condition without water. The foresaid organic silicon compound was prepared by adding a mixture of 100 g (0.56 mol) of $H_2NCH_2CH_2CH_2Si(OCH_3)_3$ and 166 g (1.1 mol) of $Si(OCH_3)_4$ drop by drop into 180 g (1 mol) of water placed in a container at room temperature and the mixture was stirred at 60° C. for an hour following to completion of said dropping of the whole quantity. Hereinafter, the organic silicon compound prepared according to the above-described process is designated as "organic silicon compound B".

Besides, C.I. acid black 2 was basically contained in the ink as the dye. However, in Examples C12 to C14, different colors were contained in the ink. Further, in Examples C1 to C7 and C12 to C14, an organic diamine was used as the multimer-forming substance, and in Examples C8 to C11, an organic triamine was used as the same.

| Example C1 | |
|---|---|
| C.I. acid black 2 | 5% |
| Ethylene diamine | 0.3% |
| Glycerol | 10% |
| Diethylene glycol monobutyl ether | 10% |
| Organic silicon compound B | 5% |
| Pure water | 69.7% |

| Example C2 | |
|---|---|
| C.I. acid black 2 | 5% |
| Diaminomethane | 0.2% |
| Glycerol | 10% |
| Diethylene glycol monobutyl ether | 10% |
| Organic silicon compound B | 5% |
| Pure water | 69.8% |

| Example C3 | |
|---|---|
| C.I. acid black 2 | 5% |
| 1,3-Diaminopropane | 0.3% |
| Glycerol | 10% |
| Diethylene glycol monobutyl ether | 10% |
| Organic silicon compound B | 5% |
| Pure water | 69.7% |

| Example C4 | |
|---|---|
| C.I. acid black 2 | 5% |
| 1,4-Diaminobutane | 0.4% |
| Glycerol | 10% |
| Diethylene glycol monobutyl ether | 10% |
| Organic silicon compound B | 5% |
| Pure water | 69.6% |

| Example C5 | |
|---|---|
| C.I. acid black 2 | 5% |
| 1,5-Diaminopentane | 0.4% |
| Glycerol | 10% |
| Diethylene glycol monobutyl ether | 10% |
| Organic silicon compound B | 5% |
| Pure water | 69.6% |

| Example C6 | |
|---|---|
| C.I. acid black 2 | 5% |
| 1,6-Diaminohexane | 0.5% |
| Glycerol | 10% |
| Diethylene glycol monobutyl ether | 10% |
| Organic silicon compound B | 5% |
| Pure water | 69.5% |

| Example C7 | |
|---|---|
| C.I. acid black 2 | 5% |
| 1,7-Diaminoheptane | 0.5% |
| Glycerol | 10% |
| Diethylene glycol monobutyl ether | 10% |
| Organic silicon compound B | 5% |
| Pure water | 69.5% |

-continued

Example C8

| | |
|---|---|
| C.I. acid black 2 | 5% |
| Methane triamine | 0.2% |
| Glycerol | 10% |
| Diethylene glycol monobutyl ether | 10% |
| Organic silicon compound B | 5% |
| Pure water | 69.8% |

Example C9

| | |
|---|---|
| C.I. acid black 2 | 5% |
| Propane-1,2,3-triamine | 0.3% |
| Glycerol | 10% |
| Diethylene glycol monobutyl ether | 10% |
| Organic silicon compound B | 5% |
| Pure water | 69.7% |

Example C10

| | |
|---|---|
| C.I. acid black 2 | 5% |
| 2-Aminomethylpropane-1,3-diamine | 0.3% |
| Glycerol | 10% |
| Diethylene glycol monobutyl ether | 10% |
| Organic silicon compound B | 5% |
| Pure water | 69.7% |

Example C11

| | |
|---|---|
| C.I. acid black 2 | 5% |
| 3-(2-Aminomethyl)pentane-1,5-diamine | 0.5% |
| Glycerol | 10% |
| Diethylene glycol monobutyl ether | 10% |
| Organic silicon compound B | 5% |
| Pure water | 69.5% |

Example C12

| | |
|---|---|
| C.I. acid yellow 23 | 5% |
| Ethylene diamine | 0.3% |
| Glycerol | 10% |
| Diethylene glycol monobutyl ether | 10% |
| Organic silicon compound B | 5% |
| Pure water | 69.7% |

Example C13

| | |
|---|---|
| C.I. acid red 52 | 5% |
| Ethylene diamine | 0.3% |
| Glycerol | 10% |
| Diethylene glycol monobutyl ether | 10% |
| Organic silicon compound B | 5% |
| Pure water | 69.7% |

Example C14

| | |
|---|---|
| C.I. direct blue 86 | 5% |
| Ethylene diamine | 0.3% |
| Glycerol | 10% |
| Diethylene glycol monobutyl ether | 10% |
| Organic silicon compound B | 5% |
| Pure water | 69.7% |

Then, two types of inks with the compositions described below (Comparative Examples C1 and C2) were prepared for comparison purpose, where the contents of the respective compositions are expressed in % by mass. Note that neither penetrant nor an organic silicon compound is contained in the ink in both of Comparison Examples C1 and C2. Further, note that the organic silicon compound in Comparative Example C1 is the organic silicon compound B, whereas the organic silicon compound in Comparative Example C2 is the organic silicon compound A described above.

COMPARATIVE EXAMPLE C1

| | |
|---|---|
| C.I. acid black 2 | 5% |
| Glycerol | 10% |
| Organic silicon compound B | 5% |
| Pure water | 80% |

COMPARATIVE EXAMPLE C2

| | |
|---|---|
| C.I. acid black 2 | 5% |
| Glycerol | 10% |
| Organic silicon compound A | 5% |
| Pure water | 80% |

Next, using the respective inks prepared according to the above Examples C1 to C14 and Comparative Examples C1 and C2, images were formed on a common paper (Trade name "Xerox 4024", manufactured by Xerox Inc.) by means of a commercialized printer (a printer adapted to eject ink by means of the same type of a piezoelectric actuator as that specified in the above-described embodiment, provided that the thickness of the piezoelectric actuator is significantly greater than that of said embodiment). The papers on which the images were formed are immersed in tap water, then left at room temperature to dry them and subsequently checked the presence/absence of image bleeding.

As a result, the bleeding of the images was recognized at the edge portions of the images in respect of the images formed with the inks prepared in Comparative Examples C1 and C2. On the other hand, no bleeding of the images was seen at all in respect of the images formed with the respective inks prepared in Examples C1 to C14. From the results, it is evident that high water-resistivity of the images can be acquired by incorporating either the organic diamine or the organic triamine into the ink and causing the organic diamine or the organic triamine to convert the dye molecules into their dimers or trimers, respectively.

What is claimed is:

1. An ink for ink jet recording use comprising a water-soluble dye, a humectant, a penetrant, water and a hydrolyzable organic silicon compound wherein;
    said ink adheres onto a recording medium, then said organic silicon compound gives rise to a condensation and polymerization reaction through evaporation of said water or penetration of said water into the recording medium, whereby the whole molecules of said water-soluble dye are surrounded doubly or more by silicon atoms of said organic silicon compound.

2. The ink for ink jet recording use of claim 1 wherein; the content of said organic silicon compound is set such that the ink contains silicon atoms at a ratio of 20 or more with respect to one molecule of said water-soluble dye.

3. The ink for ink jet recording use of claim 1, wherein surface tension of the ink at 25° C. is in a range from 20 mN/m to 50 mN/m.

4. An ink cartridge comprising an ink for ink jet recording use containing a water-soluble dye, a humectant, a penetrant, water and a hydrolyzable organic silicon compound, wherein;
    said ink adheres onto a recording medium, then said organic silicon compound gives rise to a condensation and polymerization reaction through evaporation of said water or penetration of said water into the recording medium, whereby the whole molecules of said water-soluble dye are surrounded doubly or more by silicon atoms of said organic silicon compound.

5. The ink cartridge of claim 4, wherein;
    the content of said organic silicon compound in said ink is set such that the ink contains silicon atoms at a ratio of 20 or more with respect to one molecules of said water-soluble dye.

6. A recording apparatus, comprising an ink for ink jet recording use, for performing recordings on a recording medium by ejecting said ink against said recording medium, said ink containing a water-soluble dye, a humectant, a penetrant, water and a hydrolyzable organic silicon compound, wherein;

said ink adheres onto said recording medium, then said organic silicon compound gives rise to a condensation and polymerization reaction through evaporation of said water or penetration of said water into said recording medium, whereby the whole molecules of said water-soluble dye are surrounded doubly or more by silicon atoms of said organic silicon compound.

7. The recording apparatus of claim 6 wherein;

the content of said organic silicon compound in said ink is set such that the ink contains silicon atoms at a ratio of 20 or more with respect to one molecule of said water-soluble dye.

8. An ink for ink jet recording use which contains a dye, a humectant, a penetrant, water and a water-soluble substance that gives rise to a condensation and polymerization reaction under a condition without water, said ink comprising a multimer-forming substance that forms hydrogen bonds, ionic bonds or covalent bonds with the dye molecules to thereby convert the dye molecules into their multimers, and said ink attaches onto a recording medium and thereafter water in said ink evaporates or penetrates into said recording medium, so that said multimer-forming substance converts said dye molecules into their multimers.

9. The ink for ink jet recording use of claim 8, wherein the dye is either an acid dye or a direct dye.

10. The ink for ink jet recording use of claim 9, wherein the multimer-forming substance is either an organic diamine or an organic triamine.

11. The ink for ink jet recording use of claim 10, wherein the organic diamine or the organic triamine is a primary amine.

12. The ink for ink jet recording use of claim 8, wherein the water-soluble substance is a hydrolyzable silane.

13. A process for preparing an ink for ink jet recording use containing a dye, a humectant, a penetrant, water, a water-soluble substance that gives rise to a condensation and polymerization reaction under a condition without water, and a multimer-forming substance that forms hydrogen bonds, ionic bonds or covalent bonds with the dye molecules to thereby convert the dye molecules into their multimers, wherein;

said water-soluble substance is added into said water following to the additions of said dye and said multimer-forming substance into said water.

14. An ink cartridge comprising an ink for ink jet recording use containing a dye, a humectant, a penetrant, water and a water-soluble substance that gives rise to a condensation and polymerization reaction under a condition without water, wherein;

said ink further contains a multimer-forming substance that forms hydrogen bonds, ionic bonds or covalent bonds with the dye molecules to thereby convert the dye molecules into their multimers, and said ink attaches onto a recording medium and thereafter water in said ink evaporates or penetrates into said recording medium, so that said multimer-forming substance converts said dye molecules into their multimers.

15. A recording apparatus, comprising an ink for ink jet recording use, for performing recordings on a recording medium by ejecting said ink against said recording medium, said ink containing a dye, a humectant, a penetrant, water and a water-soluble substance that gives rise to a condensation and polymerization reaction under a condition without water, characterized in that;

said ink further contains a multimer-forming substance that forms hydrogen bonds, ionic bonds or covalent bonds with the dye molecules to thereby convert the dye molecules into their multimers, and said ink attaches onto a recording medium and thereafter water in said ink evaporates or penetrates into said recording medium, so that said multimer-forming substance converts said dye molecules into their multimers.

* * * * *

UNITED STATES PATENT AND TRADEMARK OFFICE
CERTIFICATE OF CORRECTION

PATENT NO. : 6,988,794 B2
APPLICATION NO. : 10/468342
DATED : January 24, 2006
INVENTOR(S) : Hidekazu Arase et al.

It is certified that error appears in the above-identified patent and that said Letters Patent is hereby corrected as shown below:

<u>Title Page and column 1, line 1</u>:

Item (54),

"INKJET RECORDING INK, METHOD FOR PRODUCING SAID INK, AND INK CARTRIDGE AND RECORDING DEVICE HAVING SAID INK"

should be

--INK FOR INK JET RECORDING, PROCESS FOR PREPARING SAID INK, AND CARTRIDGE AND RECORDING APPARATUS INCLUDING SAID INK--

Signed and Sealed this

Twenty-first Day of November, 2006

JON W. DUDAS
*Director of the United States Patent and Trademark Office*